United States Patent
Ho et al.

(10) Patent No.: US 12,160,002 B2
(45) Date of Patent: *Dec. 3, 2024

(54) BINDER COMPOSITION FOR SECONDARY BATTERY

(71) Applicant: GRST International Limited, Hong Kong (CN)

(72) Inventors: Kam Piu Ho, Hong Kong (CN); Yingkai Jiang, Shenzhen (CN); Tao Gong, Shenzhen (CN)

(73) Assignee: GRST INTERNATIONAL LIMITED, Hong Kong (CN)

( * ) Notice: Subject to any disclaimer, the term of this patent is extended or adjusted under 35 U.S.C. 154(b) by 132 days.

This patent is subject to a terminal disclaimer.

(21) Appl. No.: 17/910,813

(22) PCT Filed: Sep. 25, 2020

(86) PCT No.: PCT/CN2020/117789
§ 371 (c)(1),
(2) Date: Sep. 12, 2022

(87) PCT Pub. No.: WO2021/253675
PCT Pub. Date: Dec. 23, 2021

(65) Prior Publication Data
US 2023/0121093 A1  Apr. 20, 2023

(30) Foreign Application Priority Data

| | | |
|---|---|---|
| Jun. 17, 2020 | (WO) | PCT/CN2020/096672 |
| Aug. 19, 2020 | (WO) | PCT/CN2020/110065 |
| Aug. 19, 2020 | (WO) | PCT/CN2020/110105 |

(51) Int. Cl.
H01M 4/62 (2006.01)
C08F 220/06 (2006.01)
H01M 4/02 (2006.01)

(52) U.S. Cl.
CPC .......... H01M 4/622 (2013.01); C08F 220/06 (2013.01); *C08F 2800/20* (2013.01); *H01M 2004/021* (2013.01); *H01M 2004/028* (2013.01)

(58) Field of Classification Search
CPC .............................................. H01M 2004/028
See application file for complete search history.

(56) References Cited

FOREIGN PATENT DOCUMENTS

| | | |
|---|---|---|
| CN | 104538635 A | 4/2015 |
| CN | 109690841 A | 4/2019 |

(Continued)

OTHER PUBLICATIONS

International Search Report of PCT Patent Application No. PCT/CN2020/117789 issued on Mar. 16, 2021.

*Primary Examiner* — Khanh T Nguyen
(74) *Attorney, Agent, or Firm* — Kam Wah Law

(57) ABSTRACT

An aqueous binder composition for a secondary battery electrode is provided, comprising a copolymer and a dispersion medium, wherein the copolymer comprises a structural unit (a) derived from a carboxylic acid group-containing monomer, a structural unit (b) derived from an amide group-containing monomer and a structural unit (c) derived from a nitrile group-containing monomer, with an improved binding capability. In addition, battery cells comprising the cathode prepared using the binder composition disclosed herein exhibits exceptional electrochemical performance.

19 Claims, 1 Drawing Sheet

(56) References Cited

FOREIGN PATENT DOCUMENTS

| | | | | | |
|---|---|---|---|---|---|
| CN | 110783570 | A | | 2/2020 | |
| CN | 110885650 | A | * | 3/2020 | ............ C08F 220/06 |
| EP | 2555293 | B1 | | 3/2014 | |
| JP | 2017157481 | A | * | 9/2017 | ............ C08F 236/06 |
| JP | 2018006333 | A | * | 1/2018 | .............. H01M 4/13 |
| JP | 6743954 | B1 | * | 8/2020 | ............ H01M 4/139 |
| WO | 2016181993 | A1 | | 11/2016 | |

* cited by examiner

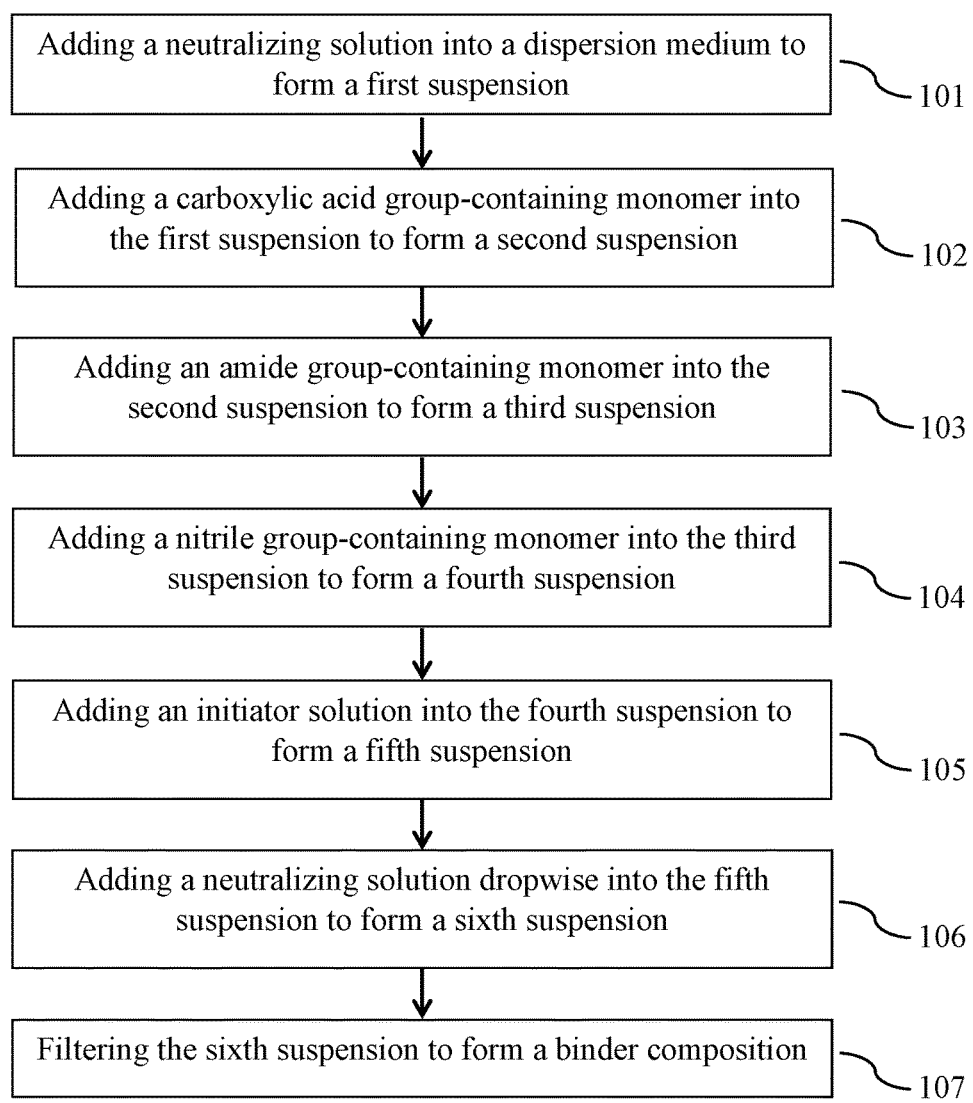

BINDER COMPOSITION FOR SECONDARY BATTERY

CROSS-REFERENCE TO RELATED APPLICATIONS

This is a U.S. national stage application of the International Patent Application No. PCT/CN2020/117789, filed Sep. 25, 2020, which claims the benefit under 35 U.S.C. § 365(c) of International Patent Application No. PCT/CN2020/096672, filed Jun. 17, 2020, International Patent Application No. PCT/CN2020/110105, filed Aug. 19, 2020 and International Patent Application No. PCT/CN2020/110065, filed Aug. 19, 2020, the content of all of which are incorporated herein by reference in their entireties.

FIELD OF THE INVENTION

The present invention relates to the field of batteries. In particular, this invention relates to a binder composition for lithium-ion batteries.

BACKGROUND OF THE INVENTION

Over the past decades, lithium-ion batteries (LIBs) have come to be widely utilized in various applications, especially consumer electronics, because of their outstanding energy density, long cycle life and high discharging capability. Due to rapid market development of electric vehicles (EV) and grid energy storage, high-performance, low-cost LIBs are currently offering one of the most promising options for large-scale energy storage devices.

Generally, lithium-ion battery electrodes are manufactured by casting an organic-based slurry onto a metallic current collector. The slurry contains electrode active material, conductive carbon, and binder in an organic solvent. The binder provides a good electrochemical stability, holds together the electrode active materials and adheres them to the current collector in the fabrication of electrodes. Polyvinylidene fluoride (PVDF) is one of the most commonly used binders in the commercial lithium-ion battery industry. However, PVDF is insoluble in water and can only dissolve in some specific organic solvents such as N-methyl-2-pyrrolidone (NMP) which is flammable and toxic and hence requires specific handling.

An NMP recovery system must be in place during the drying process to recover NMP vapors. This will generate significant costs in the manufacturing process since it requires a large capital investment. The use of less expensive and more environmentally-friendly solvents, such as aqueous solvents, most commonly water, is preferred in the present invention since it can reduce the large capital cost of the recovery system.

In view of such a problem, attempts have been made to replace conventional PVDF with more environmentally-friendly water-soluble binder materials or to make use of the known advantages of PVDF as a binder for electrode slurries without using organic solvents that require specific recovery treatment during manufacture.

Known aqueous binders such as carboxymethyl cellulose (CMC) and styrene-butadiene rubber (SBR) exhibit only marginal adhesion capability and poor cycle life. SBR, in particular, requires a thickening agent in regulating the binder viscosity. Further, SBR exhibits high expandability and undesirable agglomeration characteristics resulting in inhomogeneous dispersion, high electrode resistance and poor performance. In addition to that, within the battery, cathodes are at high voltage. Most rubbers including SBR are only stable at the low voltage of the anode and will decompose at high voltage. Therefore, their applications, especially in cathodes, are somewhat limited.

EP Patent Application Publication No. 2555293 B1 discloses a water-based electrode slurry for a lithium ion-containing electrochemical cell. The slurry comprises a combination of PVDF and SBR and at least one of polyacrylic acid (PAA) and CMC in an aqueous solution and an electrochemically active material. The proposed invention attempts to combine PVDF with a water-based slurry which allows easier handling and less environmental pollution and reduced costs while keeping the known chemical and electrochemical advantages of PVDF as a binder i.e. electrochemical stability, lifetime stability, reduced binder content enables higher C-rates, etc. Despite the fact that organic solvent free slurries could be prepared based on the proposed invention, the slurry consists of fluorine-containing binder material nonetheless. PVDF is highly fluorinated and toxic when exposed to thermal decomposition, which pose risks to the health of people and the environment.

In view of the above, there is always a need for an aqueous binder composition for lithium-ion batteries that exhibits excellent adhesion capability and high electrochemical stability with such properties sustained in the making of a cathode slurry, and thus contribute to exceptional battery electrochemical performance.

SUMMARY OF THE INVENTION

The aforementioned needs are met by various aspects and embodiments disclosed herein. Provided herein is a binder composition for a secondary battery electrode comprising a copolymer and a dispersion medium, wherein the copolymer comprises a structural unit (a) derived from a carboxylic acid group-containing monomer, a structural unit (b) derived from an amide group-containing monomer and a structural unit (c) derived from a nitrile group-containing monomer, with an improved binding capability. In addition, battery cells comprising the cathode prepared using the binder composition disclosed herein exhibits exceptional electrochemical performance.

BRIEF DESCRIPTION OF THE DRAWINGS

FIG. 1 is a flow chart of an embodiment illustrating the steps for preparing a binder composition.

DETAILED DESCRIPTION OF THE INVENTION

Provided herein is a binder composition for a secondary battery electrode comprising a copolymer and a dispersion medium, wherein the copolymer comprises a structural unit (a) derived from a carboxylic acid group-containing monomer, a structural unit (b) derived from an amide group-containing monomer and a structural unit (c) derived from a nitrile group-containing monomer.

The term "electrode" refers to a "cathode" or an "anode."

The term "positive electrode" is used interchangeably with cathode. Likewise, the term "negative electrode" is used interchangeably with anode.

The term "binder", "binder material" or "binder composition" refers to a chemical compound, mixture of compounds, or polymer which form colloidal solutions or colloidal dispersions in a dispersion medium such as water, and is used to hold an electrode material and/or a conductive agent in place and adhere them onto a conductive metal part to form an electrode. In some embodiments, the electrode does not comprise any conductive agent.

The term "conductive agent" refers to a material which is chemically inactive and has good electrical conductivity. Therefore, the conductive agent is often mixed with an electrode active material at the time of forming an electrode to improve electrical conductivity of the electrode.

The term "polymer" refers to a polymeric compound prepared by polymerizing monomers, whether of the same or a different type. The generic term "polymer" embraces the terms "homopolymer" as well as "copolymer".

The term "homopolymer" refers to a polymer prepared by the polymerization of the same type of monomer.

The term "copolymer" refers to a polymer prepared by the polymerization of two or more different types of monomers.

The term "unsaturated" as used herein, refers to a moiety having one or more units of unsaturation.

The term "alkyl" or "alkyl group" refers to a univalent group having the general formula $C_nH_{2n+1}$ derived from removing a hydrogen atom from a saturated, unbranched or branched aliphatic hydrocarbon, where n is an integer, or an integer between 1 and 20, or between 1 and 8. Examples of alkyl groups include, but are not limited to, ($C_1$-$C_8$)alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, hexyl, heptyl and octyl. Longer alkyl groups include nonyl and decyl groups. An alkyl group can be unsubstituted or substituted with one or more suitable substituents. Furthermore, the alkyl group can be branched or unbranched. In some embodiments, the alkyl group contains at least 2, 3, 4, 5, 6, 7, or 8 carbon atoms.

The term "cycloalkyl" or "cycloalkyl group" refers to a saturated or unsaturated cyclic non-aromatic hydrocarbon radical having a single ring or multiple condensed rings. Examples of cycloalkyl groups include, but are not limited to, ($C_3$-$C_7$)cycloalkyl groups, such as cyclopropyl, cyclobutyl, cyclopentyl, cyclohexyl, and cycloheptyl, and saturated cyclic and bicyclic terpenes and ($C_3$-$C_7$)cycloalkenyl groups, such as cyclopropenyl, cyclobutenyl, cyclopentenyl, cyclohexenyl, and cycloheptenyl, and unsaturated cyclic and bicyclic terpenes. A cycloalkyl group can be unsubstituted or substituted by one or two suitable substituents. Furthermore, the cycloalkyl group can be monocyclic or polycyclic. In some embodiments, the cycloalkyl group contains at least 5, 6, 7, 8, 9, or 10 carbon atoms.

The term "alkoxy" refers to an alkyl group, as previously defined, attached to the principal carbon chain through an oxygen atom. Some non-limiting examples of the alkoxy group include methoxy, ethoxy, propoxy, butoxy, and the like. And the alkoxy defined above may be substituted or unsubstituted, wherein the substituent may be, but is not limited to, deuterium, hydroxy, amino, halo, cyano, alkoxy, alkyl, alkenyl, alkynyl, mercapto, nitro, and the like.

The term "alkenyl" refers to an unsaturated straight chain, branched chain, or cyclic hydrocarbon radical that contains one or more carbon-carbon double bonds. Examples of alkenyl groups include, but are not limited to, ethenyl, 1-propenyl, or 2-propenyl, which may optionally be substituted on one or more of the carbon atoms of the radical.

The term "aryl" or "aryl group" refers to an organic radical derived from a monocyclic or polycyclic aromatic hydrocarbon by removing a hydrogen atom. Non-limiting examples of the aryl group include phenyl, naphthyl, benzyl, or tolanyl group, sexiphenylene, phenanthrenyl, anthracenyl, coronenyl, and tolanylphenyl. An aryl group can be unsubstituted or substituted with one or more suitable substituents. Furthermore, the aryl group can be monocyclic or polycyclic. In some embodiments, the aryl group contains at least 6, 7, 8, 9, or 10 carbon atoms.

The term "aliphatic" refers to a $C_1$ to $C_{30}$ alkyl group, a $C_2$ to $C_{30}$ alkenyl group, a $C_2$ to $C_{30}$ alkynyl group, a $C_1$ to $C_{30}$ alkylene group, a $C_2$ to $C_{30}$ alkenylene group, or a $C_2$ to $C_{30}$ alkynylene group. In some embodiments, the alkyl group contains at least 2, 3, 4, 5, 6, 7, or 8 carbon atoms.

The term "aromatic" refers to groups comprising aromatic hydrocarbon rings, optionally including heteroatoms or substituents. Examples of such groups include, but are not limited to, phenyl, tolyl, biphenyl, o-terphenyl, m-terphenyl, p-terphenyl, naphthyl, anthryl, phenanthryl, pyrenyl, triphenylenyl, and derivatives thereof.

The term "substituted" as used to describe a compound or chemical moiety refers to that at least one hydrogen atom of that compound or chemical moiety is replaced with a second chemical moiety. Examples of substituents include, but are not limited to, halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; acyl; formyl; acyloxy; alkoxycarbonyl; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH(aryl); —N(alkyl)(aryl); —N(aryl)$_2$; —CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless it is specified otherwise.

The term "halogen" or "halo" refers to F, Cl, Br or I.

The term "monomeric unit" refers to the constitutional unit contributed by a single monomer to the structure of a polymer.

The term "structural unit" refers to the total monomeric units contributed by the same monomer type in a polymer.

The term "carboxylic salt group" refers to the carboxylate salt formed when a carboxylic acid reacts with a base. In some embodiments, the proton of the carboxylic acid is replaced with a metal cation. In some embodiments, the proton of the carboxylic acid is replaced with an ammonium ion.

The term "applying" refers to an act of laying or spreading a substance on a surface.

The term "current collector" refers to any conductive substrate, which is in contact with an electrode layer and is capable of conducting an electrical current flowing to electrodes during discharging or charging a secondary battery. Some non-limiting examples of the current collector include a single conductive metal layer or substrate and a single conductive metal layer or substrate with an overlying conductive coating layer, such as a carbon black-based coating layer. The conductive metal layer or substrate may be in the form of a foil or a porous body having a three-dimensional network structure, and may be a polymeric or metallic material or a metalized polymer. In some embodiments, the three-dimensional porous current collector is covered with a conformal carbon layer.

The term "electrode layer" refers to a layer, which is in contact with a current collector, that comprises an electrochemically active material. In some embodiments, the electrode layer is made by applying a coating on to the current collector. In some embodiments, the electrode layer is located on the surface of the current collector. In other embodiments, the three-dimensional porous current collector is coated conformally with an electrode layer.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "particle size D50" refers to a volume-based accumulative 50% size (D50), which is a particle size at a point of 50% on an accumulative curve (i.e., a diameter of a particle in the 50th percentile (median) of the volumes of particles) when the accumulative curve is drawn so that a particle size distribution is obtained on the volume basis and the whole volume is 100%. Further, with respect to the cathode active material of the present invention, the particle size D50 means a volume-averaged particle size of secondary particles which can be formed by mutual agglomeration of primary particles, and in a case where the particles are composed of the primary particles only, it means a volume-averaged particle size of the primary particles.

The term "polydispersity index" or "PDI" refers to a ratio of the weight average molecular weight ($M_w$) relative to the number average molecular weight ($M_n$). It is a measure of the distribution of the molecular weight within a given binder composition sample.

The term "solid content" refers to the amount of non-volatile material remaining after evaporation.

The term "mean roughness depth" or "$R_z$" refers to the arithmetic mean value of the single roughness depths of consecutive sampling lengths of a current collector.

The term "peeling strength" refers to the amount of force required to separate a current collector and an electrode active material coating that are bonded to each other. It is a measure of the binding strength between such two materials and is usually expressed in N/cm.

The term "adhesive strength" refers to the amount of force required to separate a current collector and a binder composition coating that are bonded to each other. It is a measure of the adhesion strength between such two materials and is usually expressed in N/cm.

The term "swelling" refers to a volumetric evolution of binder composition after soaking in the electrolyte or the uptake of electrolyte due to electrolyte-binder interactions.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 ampere-hour (Ah) is the equivalent of 3,600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "capacity" is a characteristic of an electrochemical cell that refers to the total amount of electrical charge an electrochemical cell, such as a battery, is able to hold. Capacity is typically expressed in units of ampere-hours. The term "specific capacity" refers to the capacity output of an electrochemical cell, such as a battery, per unit weight, usually expressed in Ah/kg or mAh/g.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 0 percent to 100 percent. Moreover, any numerical range defined by two R numbers as defined in the above is also specifically disclosed.

Currently, cathodes are often prepared by dispersing a cathode active material, a binder material and a conductive agent in an organic solvent such as N-methyl-2-pyrrolidone (NMP) to form a cathode slurry, then coating the cathode slurry onto a current collector and drying it.

Very often the binders influence on cell performance is underestimated, as they are considered as electrochemically inactive materials. The aim of a binder is to adhere the active material particles and the conductive agent together to form a continuous electrical conduction path to the current collector. Along with the binding capability, a binder material should be capable of facilitating electron and ion transportation to reduce the impedance between the current collector and the electrode materials and have sufficient elasticity to prevent the electrode from swelling due to volume expansion and contraction during charging and discharging.

Polyvinylidene fluoride (PVDF) has been widely used as a binder material in the production of lithium-ion batteries. However, PVDF can only dissolve in specific organic solvents such as NMP which is flammable and toxic and hence require specific handling. An NMP recovery system must be in place during the drying process to recover NMP vapors. This will generate significant energy consumption and production costs in the manufacturing process. Accordingly, exploring a novel environmentally-friendly binder material to replace PVDF has become imperative in the development of lithium-ion battery binder materials.

Carboxymethyl cellulose (CMC) and styrene butadiene rubber (SBR) are some of the typical aqueous binders that have already been used in large-scale commercial applications. However, these binders have limited binding strengths and capabilities in preventing electrode swelling. Furthermore, within the battery, cathodes are at high voltage. Most rubbers including SBR are only stable at the low voltage of the anode and will decompose at high voltage. Therefore, their applications, especially in cathodes, are somewhat limited.

Accordingly, the present invention provides a method of preparing an aqueous binder composition comprising a copolymer and a dispersion medium, wherein the copolymer comprises a structural unit (a) derived from a carboxylic acid group-containing monomer, a structural unit (b) derived from an amide group-containing monomer and a structural unit (c) derived from a nitrile group-containing monomer. FIG. 1 is a flow chart of an embodiment illustrating the steps of method 100 for preparing a binder composition. It is found that the binder composition described herein exhibits an enhanced adhesive capability and flexibility and simultaneously has the unexpected effect of improving the capacity and electrochemical performance of cathodes formed therefrom.

In some embodiments, the binder composition described herein is produced via polymerization that involves monomers, polymers or monomer-polymer complexes being dispersed in an aqueous phase, with generation of free radicals with a water-soluble free radical initiator.

In some embodiments, the neutralizing solution is prepared by dissolving the neutralizing agent in water. In some embodiments, the first suspension is formed by adding a neutralizing solution into a dispersion medium in step 101. Addition of neutralizing solution aims to improve polymerization stability and provide a pH range in which the initiator that is added at a later stage is capable of generating free radicals.

Establishing a desirable range of pH to work with is especially important in aqueous systems. Neutralizing agents are commonly used for pH adjustment. In some embodiments, the neutralizing agent include alkaline aqueous solutions. In some embodiments, the neutralizing agent may be selected from the group consisting of ammonia, sodium bicarbonate, sodium hydroxide, potassium hydroxide, lithium hydroxide, ammonium hydroxide, magnesium hydroxide, calcium hydroxide, triethylamine, dimethylethanolamine (DMEA), sodium carbonate, lithium carbonate, lithium bicarbonate and combinations thereof.

A dispersion medium is used as a solvent for the free radical initiators, neutralizing agents and other constituents. In some embodiments, the binder composition disclosed herein is prepared by an aqueous processing method in which water is used as the dispersion medium.

In some embodiments, the dispersion medium can further comprise a hydrophilic solvent selected from the group consisting of ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA), butyl acetate (BA) and combinations thereof. In some embodiments, the dispersion medium is free of water, ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA) or butyl acetate (BA).

In some embodiments, a second suspension is formed by adding a carboxylic acid group-containing monomer into the first suspension in step 102.

In other embodiments, a second suspension is formed by adding a carboxylic acid group-containing monomer solution into the first suspension. The carboxylic acid group-containing monomer solution can be prepared by dissolving a carboxylic acid group-containing monomer in water.

Structural unit (a) is derived from a carboxylic acid group-containing monomer. Any monomer that has at least one carboxylic acid group may be used as carboxylic acid group-containing monomer without any specific limitations. In some embodiments, the carboxylic acid group-containing monomer is acrylic acid, methacrylic acid, crotonic acid, 2-butyl crotonic acid, cinnamic acid, maleic acid, maleic anhydride, fumaric acid, itaconic acid, itaconic anhydride, tetraconic acid or a combination thereof. In certain embodiments, the carboxylic acid group-containing monomer is 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid or a combination thereof. In some embodiments, the carboxylic acid group-containing monomer is methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate or a combination thereof. In some embodiments, the carboxylic acid group-containing monomer is maleic anhydride, methyl maleic anhydride, dimethyl maleic anhydride, acrylic anhydride, methacrylic anhydride, methacrolein, methacryloyl chloride, methacryloyl fluoride, methacryloyl bromide, or a combination thereof.

In some embodiments, the proportion of the carboxylic acid group-containing monomer is from about 40% to about 70%, from about 40% to about 68%, from about 40% to about 66%, from about 40% to about 65%, from about 40% to about 64%, from about 40% to about 63%, from about 40% to about 62%, from about 40% to about 61%, from about 40% to about 60%, from about 40% to about 59%, from about 40% to about 58%, from about 40% to about 57%, from about 40% to about 56%, from about 40% to about 55%, from about 41% to about 55%, from about 42% to about 55%, from about 43% to about 55%, from about 44% to about 55%, from about 45% to about 55%, from about 43% to about 58%, from about 47% to about 53%, from about 47% to about 57%, from about 45% to about 58% or from about 45% to about 60% by weight, based on the total weight of monomers added in the preparation of the binder composition.

In some embodiments, the proportion of the carboxylic acid group-containing monomer is less than 70%, less than 69%, less than 68%, less than 67%, less than 66%, less than 65%, less than 64%, less than 63%, less than 62%, less than 61%, less than 60%, less than 59%, less than 58%, less than 57%, less than 56%, less than 55%, less than 54%, less than 53%, less than 52%, less than 51%, less than 50%, less than 49%, less than 48%, less than 47%, less than 46%, less than 45%, less than 44%, less than 43% or less than 42% by weight, based on the total weight of monomers added in the preparation of the binder composition. In some embodiments, the proportion of the carboxylic acid group-containing monomer is more than 40%, more than 41%, more than 42%, more than 43%, more than 44%, more than 45%, more than 46%, more than 47%, more than 48%, more than 49%, more than 50%, more than 51%, more than 52%, more than 53%, more than 54%, more than 55%, more than 56%, more than 57%, more than 58%, more than 59%, more than 60%, more than 61%, more than 62%, more than 63%, more than 64%, more than 65%, more than 66%, more than 67% or more than 68% by weight, based on the total weight of monomers added in the preparation of the binder composition.

In some embodiments, each of the first suspension and the second suspension is independently stirred for a time period of from about 5 minutes to about 45 minutes, from about 5 minutes to about 40 minutes, from about 5 minutes to about 35 minutes, from about 10 minutes to about 35 minutes, from about 15 minutes to about 35 minutes, from about 20 minutes to about 35 minutes or from about 25 minutes to about 35 minutes. In some embodiments, each of the first suspension and the second suspension is independently stirred for a time period of less than 45 minutes, less than 40 minutes, less than 35 minutes, less than 30 minutes, less than 25 minutes, less than 20 minutes, less than 15 minutes or less than 10 minutes. In some embodiments, each of the first suspension and the second suspension is independently stirred for a time period of more than 5 minutes, more than 10 minutes, more than 15 minutes, more than 20 minutes, more than 25 minutes, more than 30 minutes, more than 35 minutes or more than 40 minutes.

In some embodiments, each of the first suspension and the second suspension is independently stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, each of the first suspension and the second suspension is independently stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, each of the first suspension and the second suspension is independently stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the temperature of the second suspension is from about 20° C. to about 30° C., from about 20° C. to about 29° C., from about 20° C. to about 28° C., from about 20° C. to about 27° C., from about 20° C. to about 26° C., from about 20° C. to about 25° C., from about 21° C. to about 30° C., from about 22° C. to about 30° C., from about 23° C. to about 30° C., from about 24° C. to about 30° C., from about 25° C. to about 30° C., from about 22° C. to about 26° C. or from about 24° C. to about 28° C. In some embodiments, the temperature of the second suspension is less than 30° C., less than 29° C., less than 28° C., less than 27° C., less than 26° C., less than 25° C., less than 24° C., less than 23° C., less than 22° C. or less than 21° C. In some embodiments, the temperature of the second suspension is more than 20° C., more than 21° C., more than 22° C., more than 23° C., more than 24° C., more than 25° C., more than 26° C., more than 27° C., more than 28° C. or more than 29° C.

In some embodiments, a third suspension is formed by adding an amide group-containing monomer into the second suspension in step 103.

In other embodiments, a third suspension is formed by adding an amide group-containing monomer solution into the second suspension. The amide group-containing monomer solution can be prepared by dissolving an amide group-containing monomer in water.

Structural unit (b) is derived from an amide group-containing monomer. Any monomer that has at least one amide group may be used as amide group-containing monomer without any specific limitations. In some embodiments, the amide group-containing monomer is acrylamide, methacrylamide, N-methyl methacrylamide, N-ethyl methacrylamide, N-n-propyl methacrylamide, N-isopropyl methacrylamide, isopropyl acrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl)methacrylamide, N-(ethoxymethyl) methacrylamide, N-(propoxymethyl)methacrylamide, N-(butoxymethyl)methacrylamide, N,N-dimethylaminopropyl methacrylamide, N,N-dimethylaminoethyl methacrylamide, N,N-dimethylol methacrylamide, diacetone methacrylamide, diacetone acrylamide, methacryloyl morpholine, N-hydroxyl methacrylamide, N-methoxymethyl acrylamide, N-methoxymethyl methacrylamide, N,N'-methylene-bis-acrylamide (MBA), N-hydroxymethyl acrylamide or a combination thereof.

In some embodiments, the proportion of the amide group-containing monomer is from about 15% to about 35%, from about 15% to about 34%, from about 15% to about 33%, from about 15% to about 32%, from about 15% to about 31%, from about 15% to about 30%, from about 16% to about 30%, from about 17% to about 30%, from about 17% to about 29%, from about 17% to about 28%, from about 17% to about 27%, from about 18% to about 27%, from about 19% to about 27%, from about 20% to about 27%, from 20% to about 25% or from about 15% to about 25% by weight, based on the total weight of monomers added in the preparation of the binder composition.

In some embodiments, the proportion of the amide-group-containing monomer is less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17% or less than 16% by weight, based on the total weight of monomers added in the preparation of the binder composition. In some embodiments, the proportion of the amide group-containing monomer is more than 15%, more than 16%, more than 17%, more than 18%, more than 19%, more than 20%, more than 21%, more than 22%, more than 23%, more than 24%, more than 25%, more than 26%, more than 27%, more than 28% or more than 29% by weight, based on the total weight of monomers added in the preparation of the binder composition.

In some embodiments, the third suspension is stirred for a time period of from about 5 minutes to about 60 minutes, from about 5 minutes to about 55 minutes, from about 5 minutes to about 50 minutes, from about 10 minutes to about 50 minutes, from about 15 minutes to about 50 minutes, from about 20 minutes to about 50 minutes, from about 25 minutes to about 50 minutes, from about 30 minutes to about 50 minutes or from about 35 minutes to about 50 minutes. In some embodiments, the third suspension is stirred for a time period of less than 60 minutes, less than 55 minutes, less than 50 minutes, less than 45 minutes, less than 40 minutes, less than 35 minutes, less than 30 minutes, less than 25 minutes, less than 20 minutes, less than 15 minutes or less than 10 minutes. In some embodiments, the third suspension is stirred for a time period of more than 5 minutes, more than 10 minutes, more than 15 minutes, more than 20 minutes, more than 25 minutes, more than 30 minutes, more than 35 minutes, more than 40 minutes, more than 45 minutes, more than 50 minutes or more than 55 minutes.

In some embodiments, the third suspension is stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, the third suspension is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the third suspension is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the temperature of the third suspension is elevated to from about 30° C. to about 70° C., from about 32° C. to about 70° C., from about 34° C. to about 70° C., from about 36° C. to about 70° C., from about 38° C. to about 70° C., from about 40° C. to about 70° C., from about 42° C. to about 70° C., from about 44° C. to about 70° C., from about 46° C. to about 70° C., from about 48° C. to about 70° C. or from about 50° C. to about 70° C.

In some embodiments, the temperature of the third suspension is elevated to less than 70° C., less than 68° C., less than 66° C., less than 64° C., less than 62° C., less than 60° C., less than 58° C., less than 56° C., less than 54° C., less than 52° C., less than 50° C., less than 48° C., less than 46° C., less than 44° C., less than 42° C., less than 40° C., less than 38° C., less than 36° C. or less than 34° C. In some embodiments, the temperature of the third suspension is elevated to more than 30° C., more than 32° C., more than 34° C., more than 36° C., more than 38° C., more than 40° C., more than 42° C., more than 44° C., more than 46° C., more than 48° C., more than 50° C., more than 52° C., more than 54° C., more than 56° C., more than 58° C., more than 60° C., more than 62° C., more than 64° C. or more than 66° C.

In some embodiments, a fourth suspension is formed by adding a nitrile group-containing monomer into the third suspension in step 104.

In other embodiments, a fourth suspension is formed by adding a nitrile group-containing monomer solution into the third suspension. The nitrile group-containing monomer solution can be prepared by dissolving a nitrile group-containing monomer in water.

Structural unit (c) is derived from a nitrile group-containing monomer. Any monomer that has at least one nitrile group may be used as nitrile group-containing monomer without any specific limitations. In some embodiments, the nitrile group-containing monomer include α,β-ethylenically unsaturated nitrile monomers. In some embodiments, the nitrile group-containing monomer is acrylonitrile, α-halogenoacrylonitrile, α-alkylacrylonitrile or a combination thereof. In some embodiments, the nitrile group-containing monomer is α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl)acrylonitrile, α-(chlorophenyl)acrylonitrile, α-(cyanophenyl)acrylonitrile, vinylidene cyanide, or a combination thereof.

In certain embodiments, the proportion of the nitrile group-containing monomer is from about 10% to about 24%, from about 10.5% to about 24%, from about 11% to about 24%, from about 11.5% to about 24%, from about 12% to about 24%, from about 12.2% to about 24%, from about 12.4% to about 24%, from about 12.6% to about 24%, from about 12.8% to about 24%, from about 13% to about 24%, from about 13.2% to about 24%, from about 13.4% to about 24%, from about 13.6% to about 24%, from about 13.8% to about 24%, from about 14% to about 24%, from about 14.2% to about 24%, from about 14.4% to about 24%, from about 14.6% to about 24%, from about 14.8% to about 24%, from about 15% to about 24%, from about 15.2% to about 24%, from about 15.4% to about 24%, from about 15.6% to about 24%, from about 15.8% to about 24%, from about 16% to about 24%, from about 16.2% to about 24%, from about 16.4% to about 24%, from about 16.6% to about 24%, from about 16.8% to about 24%, from about 17% to about 24%, from about 17% to about 23.8%, from about 17% to about 23.6%, from about 17% to about 23.4%, from about 17% to about 23.2%, from about 17% to about 23%, from about 16% to about 23%, from about 16% to about 22% or from about 15% to about 22% by weight, based on the total weight of monomers added in the preparation of the binder composition.

In some embodiments, the proportion of the nitrile group-containing monomer is more than 10%, more than 11%, more than 12%, more than 13%, more than 14%, more than 15%, more than 16%, more than 17%, more than 18%, more than 19%, more than 20%, more than 21%, more than 22% or more than 23% by weight, based on the total weight of monomers added in the preparation of the binder composition. In some embodiments, the proportion of the nitrile group-containing monomer is less than 24%, less than 23%, less than 22%, less than 21%, less than 20%, less than 19%, less than 18%, less than 17%, less than 16%, less than 15%, less than 14%, less than 13%, less than 12% or less than 11% by weight, based on the total weight of monomers added in the preparation of the binder composition.

In certain embodiments, combinations of a carboxylic acid group-containing monomer, a nitrile group-containing monomer and an amide group-containing monomer may be added into the first suspension to form a second suspension without forming the third suspension and the fourth suspension. In other embodiments, a carboxylic acid group-containing monomer, a nitrile group-containing monomer, an amide group-containing monomer or combinations thereof are added sequentially into the first suspension to form a second suspension, a third suspension or the fourth suspension. Stirring or dispersion may be employed between the additions. This is advantageous as it allows better dispersion of materials. In the case where combinations of monomers are added sequentially, formation of the third suspension or the fourth suspension may be omitted.

In some embodiments, the fourth suspension is stirred for a time period of from about 5 minutes to about 30 minutes, from about 5 minutes to about 28 minutes, from about 5 minutes to about 26 minutes, from about 5 minutes to about 24 minutes, from about 5 minutes to about 22 minutes, from about 5 minutes to about 20 minutes, from about 5 minutes to about 18 minutes or from about 5 minutes to about 15 minutes. In some embodiments, the fourth suspension is stirred for a time period of less than 30 minutes, less than 28 minutes, less than 26 minutes, less than 24 minutes, less than 22 minutes, less than 20 minutes, less than 18 minutes, less than 16 minutes, less than 14 minutes, less than 12 minutes, less than 10 minutes or less than 8 minutes. In some embodiments, the fourth suspension is stirred for a time period of more than 5 minutes, more than 7 minutes, more than 10 minutes, more than 12 minutes, more than 14 minutes, more than 16 minutes, more than 18 minutes, more than 20 minutes, more than 22 minutes, more than 24 minutes, more than 26 minutes or more than 28 minutes.

In some embodiments, the fourth suspension is stirred at a speed of from about 10 rpm to about 600 rpm, from about 10 rpm to about 550 rpm, from about 10 rpm to about 500 rpm, from about 10 rpm to about 450 rpm, from about 10 rpm to about 400 rpm, from about 10 rpm to about 350 rpm, from about 10 rpm to about 300 rpm, from about 10 rpm to about 250 rpm, from about 10 rpm to about 200 rpm, from about 10 rpm to about 180 rpm, from about 10 rpm to about 160 rpm, from about 10 rpm to about 140 rpm, from about 10 rpm to about 120 rpm, from about 10 rpm to about 100 rpm, from about 20 rpm to about 100 rpm, from about 30 rpm to about 100 rpm or from about 40 rpm to about 100 rpm. In some embodiments, the fourth suspension is stirred at a speed of less than 600 rpm, less than 550 rpm, less than 500 rpm, less than 450 rpm, less than 400 rpm, less than 350 rpm, less than 300 rpm, less than 250 rpm, less than 200 rpm, less than 150 rpm, less than 100 rpm or less than 50 rpm. In some embodiments, the fourth suspension is stirred at a speed of more than 10 rpm, more than 50 rpm, more than 100 rpm, more than 150 rpm, more than 200 rpm, more than 250 rpm, more than 300 rpm, more than 350 rpm, more than 400 rpm, more than 450 rpm, more than 500 rpm or more than 550 rpm.

In some embodiments, the copolymer is obtained via polymerization of a composition. In some embodiments, the composition comprises a carboxylic salt group-containing monomer, a carboxylic acid group-containing monomer, a nitrile group-containing monomer and an amide group-containing monomer. In some embodiments, formation of a carboxylic salt group-containing monomer is resulted from the neutralization of a carboxylic acid group-containing monomer by the neutralizing agent added in step 101.

In some embodiments, the carboxylic salt group-containing monomer is acrylic acid salt, methacrylic acid salt, crotonic acid salt, 2-butyl crotonic acid salt, cinnamic acid salt, maleic acid salt, maleic anhydride salt, fumaric acid salt, itaconic acid salt, itaconic anhydride salt, tetraconic acid salt or a combination thereof. In certain embodiments, the carboxylic salt group-containing monomer is 2-ethylacrylic acid salt, isocrotonic acid salt, cis-2-pentenoic acid salt, trans-2-pentenoic acid salt, angelic acid salt, tiglic acid salt, 3,3-dimethyl acrylic acid salt, 3-propyl acrylic acid salt, trans-2-methyl-3-ethyl acrylic acid salt, cis-2-methyl-3-ethyl acrylic acid salt, 3-isopropyl acrylic acid salt, trans-3-methyl-3-ethyl acrylic acid salt, cis-3-methyl-3-ethyl acrylic acid salt, 2-isopropyl acrylic acid salt, trimethyl acrylic acid salt, 2-methyl-3,3-diethyl acrylic acid salt, 3-butyl acrylic acid salt, 2-butyl acrylic acid salt, 2-pentyl acrylic acid salt, 2-methyl-2-hexenoic acid salt, trans-3-methyl-2-hexenoic acid salt, 3-methyl-3-propyl acrylic acid salt, 2-ethyl-3-propyl acrylic acid salt, 2,3-diethyl acrylic acid salt, 3,3-diethyl acrylic acid salt, 3-methyl-3-hexyl acrylic acid salt, 3-methyl-3-tert-butyl acrylic acid salt, 2-methyl-3-pentyl acrylic acid salt, 3-methyl-3-pentyl acrylic acid salt, 4-methyl-2-hexenoic acid salt, 4-ethyl-2-hexenoic acid salt, 3-methyl-2-ethyl-2-hexenoic acid salt, 3-tert-butyl acrylic acid salt, 2,3-dimethyl-3-ethyl acrylic acid salt, 3,3-dimethyl-2-ethyl acrylic acid salt, 3-methyl-3-isopropyl acrylic acid salt, 2-methyl-3-isopropyl acrylic acid salt, trans-2-octenoic acid salt, cis-2-octenoic acid salt, trans-2-decenoic acid salt, α-acetoxyacrylic acid salt, β-trans-aryloxyacrylic acid salt, α-chloro-β-E-methoxyacrylic acid salt or a combination thereof. In some embodiments, the carboxylic salt group-containing monomer is methyl maleic acid salt, dimethyl maleic acid salt, phenyl maleic acid salt, bromo maleic acid salt, chloromaleic acid salt, dichloromaleic acid salt, fluoromaleic acid salt, difluoro maleic acid salt or a combination thereof.

In some embodiments, the carboxylic salt group-containing monomer is an alkali metal carboxylic salt group-containing monomer. Examples of an alkali metal forming the alkali metal carboxylic salt include lithium, sodium and potassium. In some embodiments, the carboxylic salt group-containing monomer is an ammonium carboxylic salt group-containing monomer.

In some embodiments, the molar ratio of the carboxylic acid group-containing monomer to the carboxylic salt group-containing monomer in the composition is from about 0 to about 0.8, from about 0 to about 0.78, from about 0 to about 0.76, from about 0 to about 0.74, from about 0 to about 0.72, from about 0 to about 0.7, from about 0 to about 0.68, from about 0 to about 0.66, from about 0 to about 0.64, from about 0 to about 0.62, from about 0 to about 0.6, from about 0 to about 0.58, from about 0 to about 0.56, from about 0 to about 0.54, from about 0 to about 0.52, from about 0 to about 0.5, from about 0 to about 0.48, from about 0 to about 0.46, from about 0 to about 0.44, from about 0 to about 0.42, from about 0 to about 0.4, from about 0 to about 0.38, from about 0 to about 0.36, from about 0 to about 0.34, from about 0 to about 0.32, from about 0 to about 0.3, from about 0.02 to about 0.3, from about 0.04 to about 0.3, from about 0.06 to about 0.3, from about 0.08 to about 0.3, from about 0.1 to about 0.3, from about 0.05 to about 0.5 or from about 0.05 to about 0.4.

In some embodiments, the molar ratio of the carboxylic acid group-containing monomer to the carboxylic salt group-containing monomer in the composition is less than 0.8, less than 0.75, less than 0.7, less than 0.65, less than 0.6, less than 0.55, less than 0.5, less than 0.45, less than 0.4, less than 0.35, less than 0.3, less than 0.25, less than 0.2, less than 0.15, less than 0.1 or less than 0.05. In some embodiments, the molar ratio of the carboxylic acid group-containing monomer to the carboxylic salt group-containing monomer in the composition is more than 0, more than 0.05, more than 0.1, more than 0.15, more than 0.2, more than 0.25, more than 0.3, more than 0.35, more than 0.4, more than 0.45, more than 0.5, more than 0.55, more than 0.6, more than 0.65, more than 0.7 or more than 0.75.

In some embodiments, the proportion of the carboxylic acid group-containing monomer is from about 0% to about 30%, from about 0% to about 29%, from about 0% to about 28%, from about 0% to about 27.5%, from about 0% to about 27%, from about 0% to about 26.5%, from about 0% to about 26%, from about 0% to about 25%, from about 0% to about 24%, from about 0% to about 23%, from about 0% to about 22%, from about 0% to about 21%, from about 0% to about 20%, from about 0% to about 19%, from about 0% to about 18%, from about 0% to about 17%, from about 0% to about 16%, from about 0% to about 15%, from about 1% to about 15%, from about 2% to about 15%, from about 3% to about 15%, from about 4% to about 15%, from about 5% to about 15%, from about 6% to about 15%, from about 6% to about 14%, from about 6% to about 13%, from about 5% to about 20% or from about 5% to about 25% by mole, based on the total number of moles of monomers in the composition.

In some embodiments, the proportion of the carboxylic acid group-containing monomer is less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13%, less than 12%, less than 11%, less than 10%, less than 9%, less than 8%, less than 7%, less than 6%, less than 5%, less than 4%, less than 3% or less than 2% by mole, based on the total number of moles of monomers in the composition. In some embodiments, the proportion of the carboxylic acid group-containing monomer is more than 0%, more than 1%, more than 2%, more than 3%, more than 4%, more than 5%, more than 6%, more than 7%, more than 8%, more than 9%, more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27% or more than 28% by mole, based on the total number of moles of monomers in the composition.

In some embodiments, the proportion of the carboxylic salt group-containing monomer is from about 25% to about 45%, from about 25.5% to about 45%, from about 26% to about 45%, from about 26.5% to about 45%, from about 27% to about 45%, from about 27.5% to about 45%, from about 28% to about 45%, from about 28.5% to about 45%, from about 29% to about 45%, from about 29.5% to about 45%, from about 30% to about 45%, from about 30% to about 44.5%, from about 30% to about 44%, from about 30% to about 43.5%, from about 30% to about 43%, from about 30% to about 42.5%, from about 30% to about 42%, from about 30% to about 41.5%, from about 30% to about 41%, from about 30% to about 40.5%, from about 30% to about 40%, from about 25% to about 35% or from about 35% to about 40% by mole, based on the total number of moles of monomers in the composition.

In some embodiments, the proportion of the carboxylic salt group-containing monomer is less than 45%, less than 44%, less than 43%, less than 42%, less than 41%, less than 40%, less than 39%, less than 38%, less than 37%, less than 36%, less than 35%, less than 34%, less than 33%, less than 32%, less than 31%, less than 30%, less than 29%, less than 28%, less than 27% or less than 26% by mole, based on the total number of moles of monomers in the composition. In some embodiments, the proportion of the carboxylic salt group-containing monomer is more than 25%, more than 26%, more than 27%, more than 28%, more than 29%, more than 30%, more than 31%, more than 32%, more than 33%, more than 34%, more than 35%, more than 36%, more than 37%, more than 38% or more than 39% by mole, based on the total number of moles of monomers in the composition.

In some embodiments, the proportion of the nitrile group-containing monomer is from about 10% to about 30%, from about 11% to about 30%, from about 12% to about 30%, from about 13% to about 30%, from about 14% to about 30%, from about 15% to about 30%, from about 16% to about 30%, from about 17% to about 30%, from about 18% to about 30%, from about 19% to about 30%, from about 20% to about 30%, from about 20% to about 29%, from about 20% to about 28%, from about 20% to about 27%, from about 20% to about 26%, from about 20% to about 25%, from about 11% to about 25%, from about 12% to about 25%, from about 13% to about 25%, from about 14% to about 25%, from about 15% to about 25%, from about 16% to about 27%, from about 17% to about 27%, from about 18% to about 27%, from about 19% to about 27% or from about 10% to about 27% by mole, based on the total number of moles of monomers in the composition.

In some embodiments, the proportion of the nitrile group-containing monomer is less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13% or less than 12% by mole, based on the total number of moles of monomers in the composition. In some embodiments, the proportion of the nitrile group-containing monomer is more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27% or more than 28% by mole, based on the total number of moles of monomers in the composition.

In some embodiments, the proportion of the amide group-containing monomer is from about 10% to about 35%, from about 10% to about 34%, from about 10% to about 33%, from about 10% to about 32%, from about 10% to about 31%, from about 10% to about 30%, from about 11% to about 30%, from about 12% to about 30%, from about 13% to about 30%, from about 14% to about 30%, from about 15% to about 30%, from about 16% to about 30%, from about 17% to about 30%, from about 18% to about 30%, from about 19% to about 30%, from about 20% to about 30%, from about 20% to about 29%, from about 20% to about 28%, from about 15% to about 35% or from about 20% to about 35% by mole, based on the total number of moles of monomers in the composition.

In some embodiments, the proportion of the amide group-containing monomer is less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 18%, less than 16%, less than 14% or less than 12% by mole, based on the total number of moles of monomers in the composition. In some embodiments, the proportion of the amide group-containing monomer is more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27%, more than 28%, more than 29%, more than 30%, more than 32% or more than 34% by mole, based on the total number of moles of monomers in the composition.

In some embodiments, the initiator solution is prepared by dissolving an initiator in water. In some embodiments, a fifth suspension is formed by adding an initiator solution into the fourth suspension in step 105.

In other embodiments, a fifth suspension is formed by adding portions of the initiator solution sequentially into the fourth suspension. Stirring or dispersion may be employed between the additions.

Polymerization occurred in the present invention follows the radical mechanism, wherein an initiator acts to generate free radicals, which in turn lead to polymer chains propagation. The free radicals used herein can be produced using thermal decomposition or redox reactions. The free radical initiator(s) disclosed herein is/are water-soluble.

The water-soluble free radical initiator decomposes thermally in the aqueous phase to give radicals which can initiate the polymerization. In some embodiments, the water-soluble initiator may be selected from the group consisting of persulfate-based initiators such as ammonium persulfate, sodium persulfate, potassium persulfate and the like; azo-based initiators such as azobis(isobutyl-amidine hydrochloride) (AIBA), 2,2'-azobis(2-methylpropionamidine) dihydrochloride, 2,2'-azobis(2-amidinopropane) dihydrochloride (AAPH), 2,2'-azobis[2-(2-imidazolin-2-yl)propane]dihydrochloride, bis[2-(4'-sulfophenyl)alkyl]-2,2'-azodiisobutyrate ammonium salts, 2,2'-azobis(N-2'-methylpropanoyl-2-amino-alkyl-1)-sulfonate and the like; peroxide-based initiators such as hydrogen peroxide, t-butyl hydroperoxide, succinic acid peroxide and the like and combinations thereof.

In some embodiments, the water-soluble free radical initiator can be used together with a reducing agent to establish a redox initiator system. This allows generation of free radicals through an oxidation-reduction reaction at relatively low temperatures and promotes an enhancement in polymerization rate.

In some embodiments, a reducing agent solution is prepared by dissolving the reducing agent in water. In some embodiments, the reducing agent can be selected from the group consisting of sodium bisulfite, sodium metabisulfite, sodium sulfite, sodium thiosulfate, thiourea dioxide, ferrous sulfate, ferrous chloride, ascorbic acid, citric acid, tartaric acid, erythorbic acid, glucose metal salt of formaldehyde sulfoxylate, Bruggolite FF6M, and combinations thereof.

In some embodiments, when a redox initiator system is selected as the initiator, the molar ratio of the water-soluble free radical initiator to the reducing agent is from about 0.2 to about 10, from about 0.2 to about 9, from about 0.2 to about 8, from about 0.2 to about 7, from about 0.2 to about 6, from about 0.2 to about 5, from about 0.3 to about 5, from about 0.4 to about 5, from about 0.5 to about 5, from about 0.6 to about 5, from about 0.7 to about 5, from about 0.8 to about 5, from about 0.9 to about 5, from about 1 to about 5, from about 0.5 to about 4.5, from about 0.5 to about 4, from about 0.6 to about 3.5, from about 0.6 to about 3, from about 0.8 to about 3 or from about 0.2 to about 1.

In some embodiments, when a redox initiator system is selected as the initiator, the molar ratio of the water-soluble free radical initiator to the reducing agent is less than 10, less than 9, less than 8, less than 7, less than 6, less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4, less than 1.2, less than 1, less than 0.8, less than 0.6 or less than 0.4.

In some embodiments, when a redox initiator system is selected as the initiator, the molar ratio of the water-soluble free radical initiator to the reducing agent is more than 0.2, more than 0.4, more than 0.6, more than 0.8, more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6, more than 4.8, more than 5, more than 6, more than 7, more than 8 or more than 9.

The polymerization temperature is dependent on the type of initiator applied. In some embodiments, the reaction temperature of the polymerization is from about 50° C. to about 90° C., from about 50° C. to about 85° C., from about 50° C. to about 80° C., from about 50° C. to about 75° C., from about 50° C. to about 70° C., from about 55° C. to about 75° C., from about 55° C. to about 80° C., from about 55° C. to about 85° C., from about 60° C. to about 80° C., from about 60° C. to about 75° C., from about 60° C. to about 70° C. or from about 55° C. to about 70° C. When the reaction temperature of the polymerization is within the above range, a higher reaction stability could be achieved and the binder composition could exhibit a better overall binding performance.

In some embodiments, the reaction temperature of the polymerization is less than 90° C., less than 88° C., less than 86° C., less than 84° C., less than 82° C., less than 80° C., less than 78° C., less than 76° C., less than 74° C., less than 72° C., less than 70° C., less than 68° C., less than 66° C., less than 64° C., less than 62° C., less than 60° C., less than 58° C., less than 56° C. or less than 54° C. In some embodiments, the reaction temperature of the polymerization is more than 50° C., more than 52° C., more than 54° C., more than 56° C., more than 58° C., more than 60° C., more than 62° C., more than 64° C., more than 66° C., more than 68° C., more than 70° C., more than 72° C., more than 74° C., more than 76° C., more than 78° C., more than 80° C., more than 82° C., more than 84° C. or more than 86° C.

In some embodiments, the total reaction time of the polymerization is from about 20 hours to about 28 hours, from about 20 hours to about 27.5 hours, from about 20 hours to about 27 hours, from about 20 hours to about 26.5 hours, from about 20 hours to about 26 hours, from about 20.5 hours to about 26 hours, from about 21 hours to about 26 hours, from about 21.5 hours to about 26 hours, from about 22 hours to about 26 hours, from about 22 hours to about 25.5 hours, from about 22 hours to about 25 hours, from about 22.5 hours to about 25 hours, from about 23 hours to about 25 hours, from about 23.5 hours to about 25 hours or from about 23.5 hours to about 24.5 hours.

In some embodiments, the total reaction time of the polymerization is less than 28 hours, less than 27.5 hours, less than 27 hours, less than 26.5 hours, less than 26 hours, less than 25.5 hours, less than 25 hours, less than 24.5 hours, less than 24 hours, less than 23.5 hours, less than 23 hours, less than 22.5 hours, less than 22 hours, less than 21.5 hours, less than 21 hours or less than 20.5 hours. In some embodiments, the total reaction time of the polymerization is more than 20 hours, more than 20.5 hours, more than 21 hours, more than 21.5 hours, more than 22 hours, more than 22.5 hours, more than 23 hours, more than 23.5 hours, more than 24 hours, more than 24.5 hours, more than 25 hours, more than 25.5 hours, more than 26 hours, more than 26.5 hours, more than 27 hours or more than 27.5 hours.

In some embodiments, the fifth suspension is stirred for a time period of from about 20 hours to about 28 hours, from about 20.25 hours to about 28 hours, from about 20.5 hours to about 28 hours, from about 20.75 hours to about 28 hours, from about 21 hours to about 28 hours, from about 21 hours to about 27.75 hours, from about 21 hours to about 27.5 hours, from about 21 hours to about 27.25 hours, from about 21 hours to about 27 hours, from about 21.25 hours to about 27 hours, from about 21.5 hours to about 27 hours, from about 21.75 hours to about 27 hours, from about 22 hours to about 27 hours, from about 22 hours to about 26.75 hours, from about 22 hours to about 26.5 hours, from about 22 hours to about 26.25 hours, from about 22 hours to about 26 hours, from about 22.25 hours to about 26 hours, from about 22.5 hours to about 26 hours, from about 22.75 hours to about 26 hours, from about 23 hours to about 26 hours, from about 23 hours to about 25.75 hours, from about 23 hours to about 25.5 hours, from about 23 hours to about 25.25 hours or from about 23 hours to about 25 hours.

In some embodiments, the fifth suspension is stirred for a time period of less than 28 hours, less than 27.5 hours, less than 27 hours, less than 26.5 hours, less than 26 hours, less than 25.5 hours, less than 25 hours, less than 24.5 hours, less than 24 hours, less than 23.5 hours, less than 23 hours, less than 22.5 hours, less than 22 hours, less than 21.5 hours, less than 21 hours or less than 20.5 hours. In some embodiments, the fifth suspension is stirred for a time period of more than 20 hours, more than 20.5 hours, more than 21 hours, more than 21.5 hours, more than 22 hours, more than 22.5 hours, more than 23 hours, more than 23.5 hours, more than 24 hours, more than 24.5 hours, more than 25 hours, more than 25.5 hours, more than 26 hours, more than 26.5 hours, more than 27 hours or more than 27.5 hours.

In some embodiments, the fifth suspension is stirred at a speed of from about 20 rpm to about 300 rpm, from about 20 rpm to about 280 rpm, from about 20 rpm to about 260 rpm, from about 20 rpm to about 240 rpm, from about 20 rpm to about 220 rpm, from about 20 rpm to about 200 rpm, from about 20 rpm to about 180 rpm, from about 20 rpm to about 160 rpm, from about 40 rpm to about 160 rpm, from about 60 rpm to about 160 rpm, from about 60 rpm to about 140 rpm, from about 80 rpm to about 140 rpm, from about 80 rpm to about 120 rpm, from about 50 rpm to about 150 rpm or from about 50 rpm to about 200 rpm.

In some embodiments, the fifth suspension is stirred at a speed of less than 300 rpm, less than 280 rpm, less than 260 rpm, less than 240 rpm, less than 220 rpm, less than 200 rpm, less than 180 rpm, less than 160 rpm, less than 140 rpm, less than 120 rpm, less than 100 rpm, less than 80 rpm, less than 60 rpm or less than 40 rpm. In some embodiments, the fifth suspension is stirred at a speed of more than 20 rpm, more than 40 rpm, more than 60 rpm, more than 80 rpm, more than 100 rpm, more than 120 rpm, more than 140 rpm, more than 160 rpm, more than 180 rpm, more than 200 rpm, more than 220 rpm, more than 240 rpm, more than 260 rpm or more than 280 rpm.

In some embodiments, the proportion of water-soluble free radical initiator is from about 0.005% to about 0.05%, from about 0.0075% to about 0.05%, from about 0.01% to about 0.05%, from about 0.01% to about 0.048%, from about 0.01% to about 0.046%, from about 0.01% to about 0.044%, from about 0.01% to about 0.042%, from about 0.01% to about 0.04%, from about 0.01% to about 0.038%, from about 0.01% to about 0.036%, from about 0.01% to about 0.034%, from about 0.01% to about 0.032%, from about 0.01% to about 0.03%, from about 0.012% to about 0.03%, from about 0.014% to about 0.03%, from about 0.016% to about 0.03%, from about 0.016% to about 0.028%, from about 0.016% to about 0.026%, from about 0.018% to about 0.026% or from about 0.02% to about 0.026% by weight, based on the total weight of monomers added in the preparation of the binder composition. When the proportion of the water-soluble initiator out of the total weight of monomers added in the preparation of the binder composition is within the above range, a higher monomer conversion rate could be achieved and the binder composition could exhibit a better overall binding performance.

In some embodiments, the proportion of water-soluble free radical initiator is less than 0.05%, less than 0.048%, less than 0.046%, less than 0.044%, less than 0.042%, less than 0.04%, less than 0.038%, less than 0.036%, less than 0.034%, less than 0.032%, less than 0.03%, less than 0.028%, less than 0.026%, less than 0.024%, less than 0.022%, less than 0.02%, less than 0.018%, less than 0.016%, less than 0.014%, less than 0.012%, less than 0.01%, less than 0.008% or less than 0.006% by weight, based on the total weight of monomers added in the preparation of the binder composition. In some embodiments, the proportion of water-soluble free radical initiator is more than 0.005%, more than 0.0075%, more than 0.01%, more than 0.012%, more than 0.014%, more than 0.016%, more than 0.018%, more than 0.02%, more than 0.022%, more than 0.024%, more than 0.026%, more than 0.028%, more than 0.03%, more than 0.032%, more than 0.034%, more than 0.036%, more than 0.038%, more than 0.04%, more than 0.042%, more than 0.044%, more than 0.046% or more than 0.048% by weight, based on the total weight of monomers added in the preparation of the binder composition.

In some embodiments, the proportion of reducing agent is from about 0.001% to about 0.03%, from about 0.0025% to about 0.03%, from about 0.005% to about 0.03%, from about 0.005% to about 0.029%, from about 0.005% to about 0.028%, from about 0.005% to about 0.027%, from about 0.005% to about 0.026%, from about 0.005% to about 0.025%, from about 0.005% to about 0.024%, from about 0.005% to about 0.023%, from about 0.005% to about 0.022%, from about 0.005% to about 0.021%, from about 0.005% to about 0.02%, from about 0.005% to about 0.019%, from about 0.005% to about 0.018%, from about 0.005% to about 0.017%, from about 0.005% to about 0.016%, from about 0.005% to about 0.015%, from about 0.006% to about 0.015%, from about 0.007% to about 0.015%, from about 0.007% to about 0.02% or from about 0.007% to about 0.025% by weight, based on the total weight of monomers added in the preparation of the binder composition.

In some embodiments, the proportion of reducing agent is less than 0.03%, less than 0.029%, less than 0.028%, less than 0.027%, less than 0.026%, less than 0.025%, less than 0.024%, less than 0.023%, less than 0.022%, less than 0.021%, less than 0.02%, less than 0.019%, less than 0.018%, less than 0.017%, less than 0.016%, less than 0.015%, less than 0.014%, less than 0.013%, less than 0.012%, less than 0.011%, less than 0.01%, less than 0.008%, less than 0.006% or less than 0.004% by weight, based on the total weight of monomers added in the preparation of the binder composition. In some embodiments, the proportion of reducing agent is more than 0.001%, more than 0.0025%, more than 0.005%, more than 0.006%, more than 0.007%, more than 0.008%, more than 0.009%, more than 0.01%, more than 0.011%, more than 0.012%, more than 0.013%, more than 0.014%, more than 0.015%, more than 0.016%, more than 0.017%, more than 0.018%, more than 0.019%, more than 0.02%, more than 0.021%, more than 0.022%, more than 0.023%, more than 0.024%, more than 0.025%, more than 0.026%, more than 0.027% or more than 0.028% by weight, based on the total weight of monomers added in the preparation of the binder composition.

In some embodiments, a neutralizing solution is prepared by dissolving the neutralizing agent in water. In some embodiments, a sixth suspension is formed by adding the neutralizing solution dropwise into the fifth suspension in step 106. The above-mentioned neutralizing agent in step 101 may be selected. In some embodiments, the neutralizing agent applied in step 101 may correspond to the neutralizing agent used in step 106. In some embodiments, the neutralizing agents applied in steps 101 and 106 may not be the same.

In some embodiments, the temperature of the fifth suspension is lowered to from about 20° C. to about 40° C., from about 20° C. to about 39° C., from about 20° C. to about 38° C., from about 20° C. to about 37° C., from about 20° C. to about 36° C., from about 20° C. to about 35° C., from about 20° C. to about 34° C., from about 20° C. to about 33° C., from about 20° C. to about 32° C., from about 20° C. to about 31° C., from about 20° C. to about 30° C., from about 21° C. to about 35° C., from about 22° C. to about 35° C., from about 23° C. to about 35° C., from about 24° C. to about 35° C. or from about 25° C. to about 35° C., prior to adding a neutralizing solution to form a sixth suspension. In some embodiments, the temperature of the fifth suspension is lowered to less than 40° C., less than 39° C., less than 38° C., less than 37° C., less than 36° C., less than 35° C., less than 34° C., less than 33° C., less than 32° C., less than 31° C., less than 30° C., less than 29° C., less than 28° C., less than 27° C., less than 26° C., less than 25° C., less than 24° C., less than 23° C., less than 22° C. or less than 21° C., prior to adding a neutralizing solution to form a sixth suspension. In some embodiments, the temperature of the fifth suspension is lowered to more than 20° C., more than 21° C., more than 22° C., more than 23° C., more than 24° C., more than 25° C., more than 26° C., more than 27° C., more than 28° C., more than 29° C., more than 30° C., more than 31° C., more than 32° C., more than 33° C., more than 34° C., more than 35° C., more than 36° C., more than 37° C., more than 38° C. or more than 39° C., prior to adding a neutralizing solution to form a sixth suspension.

In some embodiments, the total proportion of the neutralizing agent is from about 35% to about 68%, from about 35% to about 66%, from about 35% to about 64%, from about 35% to about 62%, from about 35% to about 60%, from about 35% to about 59%, from about 35% to about 58%, from about 35% to about 57%, from about 35% to about 56%, from about 35% to about 55%, from about 35% to about 54%, from about 35% to about 53%, from about 35% to about 52%, from about 35% to about 51%, from about 35% to about 50%, from about 36% to about 50%, from about 37% to about 50%, from about 38% to about 50%, from about 39% to about 50%, from about 40% to about 50%, from about 35% to about 45% or from about 42% to about 52% by mole, based on the total number of moles of monomeric units in the copolymer in the binder composition.

In some embodiments, the total proportion of the neutralizing agent is less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38% or less than 36% by mole, based on the total number of moles of monomeric units in the copolymer in the binder composition. In some embodiments, the total proportion of the neutralizing agent is more than 35%, more than 37%, more than 40%, more than 42%, more than 44%, more than 46%, more than 48%, more than 50%, more than 52%, more than 54%, more than 56%, more than 58%, more than 60%, more than 62%, more than 64% or more than 66% by mole, based on the total number of moles of monomeric units in the copolymer in the binder composition.

In some embodiments, the neutralizing solution is added dropwise into the fifth suspension for a time period of from about 15 minutes to about 120 minutes, from about 20 minutes to about 120 minutes, from about 30 minutes to about 120 minutes, from about 30 minutes to about 110 minutes, from about 30 minutes to about 100 minutes, from about 30 minutes to about 90 minutes, from about 40 minutes to about 90 minutes, from about 40 minutes to about 80 minutes, from about 45 minutes to about 80 minutes, from about 45 minutes to about 75 minutes, from about 50 minutes to about 75 minutes, from about 50 minutes to about 70 minutes, from about 55 minutes to about 70 minutes or from about 55 minutes to about 65 minutes. In some embodiments, the neutralizing solution is added dropwise into the fifth suspension for a time period of less than 120 minutes, less than 110 minutes, less than 100 minutes, less than 90 minutes, less than 80 minutes, less than 70 minutes, less than 60 minutes, less than 50 minutes, less than 40 minutes, less than 30 minutes or less than 20 minutes. In some embodiments, the neutralizing solution is added dropwise into the fifth suspension for a time period of more than 15 minutes, more than 20 minutes, more than 30 minutes, more than 40 minutes, more than 50 minutes, more than 60 minutes, more than 70 minutes or more than 80 minutes.

In some embodiments, the fifth suspension is stirred for a time period of from about 1 hour to about 6 hours, from about 1 hour to about 5.75 hours, from about 1 hour to about 5.5 hours, from about 1 hour to about 5.25 hours, from about 1 hour to about 5 hours, from about 1 hour to about 4.75 hours, from about 1 hour to about 4.5 hours, from about 1 hour to about 4.25 hours, from about 1 hour to about 4 hours, from about 1.25 hours to about 4 hours, from about 1.5 hours to about 4 hours, from about 1.75 hours to about 4 hours, from about 2 hours to about 4 hours, from about 2.25 hours to about 4 hours, from about 2.5 hours to about 4 hours, from about 2.5 hours to about 3.75 hours, from about 2.5 hours to about 3.5 hours, from about 2.5 hours to about 4 hours or from about 2 hours to about 3.5 hours during the addition of the neutralizing solution and as neutralization takes place.

In some embodiments, the fifth suspension is stirred for a time period of less than 6 hours, less than 5.75 hours, less than 5.5 hours, less than 5.25 hours, less than 5 hours, less than 4.75 hours, less than 4.5 hours, less than 4.25 hours, less than 4 hours, less than 3.75 hours, less than 3.5 hours, less than 3.25 hours, less than 3 hours, less than 2.75 hours, less than 2.5 hours, less than 2.25 hours, less than 2 hours, less than 1.75 hours or less than 1.5 hours during the addition of the neutralizing solution and as neutralization takes place. In some embodiments, the fifth suspension is stirred for a time period of more than 1 hour, more than 1.25 hours, more than 1.5 hours, more than 1.75 hours, more than 2 hours, more than 2.25 hours, more than 2.5 hours, more than 2.75 hours, more than 3 hours, more than 3.25 hours, more than 3.5 hours, more than 3.75 hours, more than 4 hours, more than 4.25 hours, more than 4.5 hours, more than 4.75 hours, more than 5 hours, more than 5.25 hours or more than 5.5 hours during the addition of the neutralizing solution and as neutralization takes place.

In some embodiments, the fifth suspension is stirred at a speed of from about 20 rpm to about 300 rpm, from about 20 rpm to about 280 rpm, from about 20 rpm to about 260 rpm, from about 20 rpm to about 240 rpm, from about 20 rpm to about 220 rpm, from about 20 rpm to about 200 rpm, from about 20 rpm to about 180 rpm, from about 20 rpm to about 160 rpm, from about 40 rpm to about 160 rpm, from about 60 rpm to about 160 rpm, from about 60 rpm to about 140 rpm, from about 80 rpm to about 140 rpm, from about 80 rpm to about 120 rpm, from about 50 rpm to about 150 rpm or from about 50 rpm to about 200 rpm.

In some embodiments, the fifth suspension is stirred at a speed of less than 300 rpm, less than 280 rpm, less than 260 rpm, less than 240 rpm, less than 220 rpm, less than 200 rpm, less than 180 rpm, less than 160 rpm, less than 140 rpm, less than 120 rpm, less than 100 rpm, less than 80 rpm, less than 60 rpm or less than 40 rpm. In some embodiments, the fifth suspension is stirred at a speed of more than 20 rpm, more than 40 rpm, more than 60 rpm, more than 80 rpm, more than 100 rpm, more than 120 rpm, more than 140 rpm, more than 160 rpm, more than 180 rpm, more than 200 rpm, more than 220 rpm, more than 240 rpm, more than 260 rpm or more than 280 rpm.

In some embodiments, a binder composition is formed by filtering the sixth suspension in step 107.

Additions of neutralizing agents in steps 101 and 106 aims to neutralize the carboxylic acid group-containing monomer added in step 102 in order to produce a binder composition that is slightly alkaline in nature. Exposing binder composition to acidic conditions is undesirable as this may disrupt the dispersion of the binder composition.

In some embodiments, structural unit (a) derived from a carboxylic acid group-containing monomer comprises a carboxylic salt group. In some embodiments, a carboxylic salt group is a salt of a carboxylic acid group. In some embodiments, structural unit (a) derived from a carboxylic acid group-containing monomer comprises a combination of a carboxylic salt group and a carboxylic acid group. In some embodiments, structural unit (a) comprises an alkali metal carboxylic salt group. Examples of an alkali metal forming the alkali metal carboxylic salt include lithium, sodium and potassium. In some embodiments, structural unit (a) comprises an ammonium carboxylic salt group.

In some embodiments, the molar ratio of the carboxylic acid group to the carboxylic salt group in the copolymer is from about 0 to about 0.2, from about 0 to about 0.19, from about 0 to about 0.18, from about 0 to about 0.17, from about 0 to about 0.16, from about 0 to about 0.15, from about 0 to about 0.14, from about 0 to about 0.13, from about 0 to about 0.12, from about 0 to about 0.11, from about 0 to about 0.1, from about 0 to about 0.09, from about 0 to about 0.08, from about 0 to about 0.07, from about 0 to about 0.06, from about 0 to about 0.05, from about 0.01 to about 0.1, from about 0.02 to about 0.12 or from about 0.01 to about 0.15.

In some embodiments, the molar ratio of the carboxylic acid group to the carboxylic salt group in the copolymer is less than 0.2, less than 0.19, less than 0.18, less than 0.17, less than 0.16, less than 0.15, less than 0.14, less than 0.13, less than 0.12, less than 0.11, less than 0.1, less than 0.09, less than 0.08, less than 0.07, less than 0.06, less than 0.05, less than 0.04, less than 0.03 or less than 0.02. In some embodiments, the molar ratio of the carboxylic acid group to the carboxylic salt group in the copolymer is more than 0, more than 0.01, more than 0.02, more than 0.03, more than 0.04, more than 0.05, more than 0.06, more than 0.07, more than 0.08, more than 0.09, more than 0.1, more than 0.11, more than 0.12, more than 0.13, more than 0.14, more than 0.15, more than 0.16, more than 0.17 or more than 0.18.

In some embodiments, the proportion of structural unit (a) in the copolymer is from about 33% to about 70%, from about 33% to about 69%, from about 33% to about 68%, from about 33% to about 67%, from about 33% to about 66%, from about 33% to about 65%, from about 33% to about 64%, from about 33% to about 63%, from about 33% to about 62%, from about 33% to about 61%, from about 33% to about 60%, from about 33% to about 59%, from about 33% to about 58%, from about 33% to about 57%, from about 33% to about 56%, from about 33% to about 55%, from about 33% to about 54%, from about 33% to about 53%, from about 33% to about 52%, from about 33% to about 51%, from about 33% to about 50%, from about 34% to about 50%, from about 35% to about 50%, from about 36% to about 50%, from about 37% to about 50%, from about 38% to about 50%, from about 39% to about 50%, from about 40% to about 50%, from about 35% to about 60% or from about 40% to about 55% by mole, based on the total number of moles of monomeric units in the copolymer in the binder composition.

In some embodiments, the proportion of structural unit (a) in the copolymer is less than 70%, less than 68%, less than 66%, less than 64%, less than 62%, less than 60%, less than 58%, less than 56%, less than 54%, less than 52%, less than 50%, less than 48%, less than 46%, less than 44%, less than 42%, less than 40%, less than 38%, less than 36% or less than 34% by mole, based on the total number of moles of monomeric units in the copolymer in the binder composition. In some embodiments, the proportion of structural unit (a) in the copolymer is more than 33%, more than 34%, more than 36%, more than 38%, more than 40%, more than 42%, more than 44%, more than 46%, more than 48%, more than 50%, more than 52%, more than 54%, more than 56%, more than 58%, more than 60%, more than 62%, more than 64% or more than 66% by mole, based on the total number of moles of monomeric units in the copolymer in the binder composition.

In some embodiments, the proportion of structural unit (b) in the copolymer is from about 10% to about 35%, from about 10% to about 34%, from about 10% to about 33%, from about 10% to about 32%, from about 10% to about 31%, from about 10% to about 30%, from about 11% to about 30%, from about 12% to about 30%, from about 13% to about 30%, from about 14% to about 30%, from about 15% to about 30%, from about 16% to about 30%, from about 17% to about 30%, from about 18% to about 30%, from about 19% to about 30%, from about 20% to about 30%, from about 20% to about 29%, from about 20% to about 28%, from about 20% to about 27%, from about 20% to about 26%, from about 20% to about 25%, from about 15% to about 28% or from about 15% to about 34% by mole, based on the total number of moles of monomeric units in the copolymer in the binder composition.

In some embodiments, the proportion of structural unit (b) in the copolymer is less than 35%, less than 34%, less than 33%, less than 32%, less than 31%, less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13% or less than 12% by mole, based on the total number of moles of monomeric units in the copolymer in the binder composition. In some embodiments, the proportion of structural unit (b) in the copolymer is more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27%, more than 28%, more than 29%, more than 30%, more than 31%, more than 32% or more than 33% by mole, based on the total number of moles of monomeric units in the copolymer in the binder composition.

In some embodiments, the proportion of structural unit (c) in the copolymer is from about 10% to about 30%, from about 11% to about 30%, from about 12% to about 30%, from about 13% to about 30%, from about 14% to about 30%, from about 15% to about 30%, from about 16% to about 30%, from about 17% to about 30%, from about 18% to about 30%, from about 19% to about 30%, from about 20% to about 30%, from about 20% to about 29%, from about 20% to about 28%, from about 20% to about 27%, from about 20% to about 26%, from about 20% to about 25%, from about 11% to about 25%, from about 12% to about 25%, from about 13% to about 25%, from about 14% to about 25%, from about 15% to about 25%, from about 16% to about 27%, from about 17% to about 27%, from about 18% to about 27%, from about 19% to about 27% or from about 10% to about 27% by mole, based on the total number of moles of monomeric units in the copolymer in the binder composition.

In some embodiments, the proportion of structural unit (c) in the copolymer is less than 30%, less than 29%, less than 28%, less than 27%, less than 26%, less than 25%, less than 24%, less than 23%, less than 22%, less than 21%, less than 20%, less than 19%, less than 18%, less than 17%, less than 16%, less than 15%, less than 14%, less than 13% or less than 12% by mole, based on the total number of moles of monomeric units in the copolymer in the binder composition. In some embodiments, the proportion of structural unit (c) in the copolymer is more than 10%, more than 11%, more than 12%, more than 13%, more than 14%, more than 15%, more than 16%, more than 17%, more than 18%, more than 19%, more than 20%, more than 21%, more than 22%, more than 23%, more than 24%, more than 25%, more than 26%, more than 27% or more than 28% by mole, based on the total number of moles of monomeric units in the copolymer in the binder composition.

In some embodiments, the proportion of the sum of structural unit (a) and structural unit (c) in the copolymer is from about 65% to about 90%, from about 65% to about 89%, from about 65% to about 88%, from about 65% to about 87%, from about 65% to about 86%, from about 65% to about 85%, from about 65% to about 84%, from about 65% to about 83%, from about 65% to about 82%, from about 65% to about 81%, from about 65% to about 80%, from about 66% to about 80%, from about 67% to about 80%, from about 68% to about 80%, from about 69% to about 80%, from about 70% to about 80%, from about 65% to about 75% or from about 70% to about 85% by mole, based on the total number of moles of monomeric units in the copolymer in the binder composition.

In some embodiments, the proportion of the sum of structural unit (a) and structural unit (c) in the copolymer is less than 90%, less than 88%, less than 86%, less than 84%, less than 82%, less than 80%, less than 78%, less than 76%, less than 74%, less than 72%, less than 70%, less than 68% or less than 66% by mole, based on the total number of moles of monomeric units in the copolymer in the binder composition. In some embodiments, the proportion of the sum of structural unit (a) and structural unit (c) in the copolymer is more than 65%, more than 67%, more than 70%, more than 72%, more than 74%, more than 76%, more than 78%, more than 80%, more than 82%, more than 84%, more than 86% or more than 88% by mole, based on the total number of moles of monomeric units in the copolymer in the binder composition.

In some embodiments, the molar ratio of the sum of structural unit (a) and structural unit (c) to the structural unit (b) in the copolymer is from about 1 to about 7, from about 1 to about 6.8, from about 1 to about 6.6, from about 1 to about 6.4, from about 1 to about 6.2, from about 1 to about 6, from about 1 to about 5.8, from about 1 to about 5.6, from about 1 to about 5.4, from about 1 to about 5.2, from about 1 to about 5, from about 1 to about 4.8, from about 1 to about 4.6, from about 1 to about 4.4, from about 1 to about 4.2, from about 1 to about 4, from about 1 to about 3.8, from about 1.2 to about 3.8, from about 1.4 to about 3.8, from about 2 to about 6, from about 2 to about 4, from about 3 to about 5 or from about 3 to about 7.

In some embodiments, the molar ratio of the sum of structural unit (a) and structural unit (c) to the structural unit (b) in the copolymer is less than 7, less than 6.8, less than 6.6, less than 6.4, less than 6.2, less than 6, less than 5.8, less than 5.6, less than 5.4, less than 5.2, less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4 or less than 1.2. In some embodiments, the molar ratio of the sum of structural unit (a) and structural unit (c) to the structural unit (b) in the copolymer is more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6, more than 4.8, more than 5, more than 5.2, more than 5.4, more than 5.6, more than 5.8, more than 6, more than 6.2, more than 6.4, more than 6.6 or more than 6.8.

In some embodiments, structural unit (a) and structural unit (b) constitute as the hydrophilic portion of the copolymer. In some embodiments, structural unit (c) constitutes as the hydrophobic portion of the copolymer.

In some embodiments, the molar ratio of the sum of the structural unit (a) and structural unit (b) to the structural unit (c) in the copolymer is from about 1 to about 7, from about 1 to about 6.8, from about 1 to about 6.6, from about 1 to about 6.4, from about 1 to about 6.2, from about 1 to about 6, from about 1 to about 5.8, from about 1 to about 5.6, from about 1 to about 5.4, from about 1 to about 5.2, from about 1 to about 5, from about 1 to about 4.8, from about 1 to about 4.6, from about 1 to about 4.4, from about 1 to about 4.2, from about 1 to about 4, from about 1 to about 3.8, from about 1 to about 3.6, from about 1 to about 3.4, from about 1.2 to about 3.4, from about 1.4 to about 3.4, from about 1.5 to about 6.7, from about 1.5 to about 5, from about 1.5 to about 4.8 or from about 1.5 to about 4.

In some embodiments, the molar ratio of the sum of the structural unit (a) and structural unit (b) to the structural unit (c) in the copolymer is less than 7, less than 6.8, less than 6.6, less than 6.4, less than 6.2, less than 6, less than 5.8, less than 5.6, less than 5.4, less than 5.2, less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4 or less than 1.2. In some embodiments, the molar ratio of the sum of the structural unit (a) and structural unit (b) to the structural unit (c) in the copolymer is more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6, more than 4.8, more than 5, more than 5.2, more than 5.4, more than 5.6, more than 5.8, more than 6, more than 6.2, more than 6.4, more than 6.6 or more than 6.8.

Addition of ester group-containing monomer in the preparation of the binder composition disclosed herein is found to result in a deterioration in electrochemical performance. In some embodiments, the binder composition is free of structural unit derived from an ester group-containing monomer. In some embodiments, the ester group-containing monomer is $C_1$ to $C_{20}$ alkyl acrylate, $C_1$ to $C_{20}$ alkyl (meth)acrylate, cycloalkyl acrylate or a combination thereof. In some embodiments, the ester group-containing monomer is methyl acrylate, ethyl acrylate, n-propyl acrylate, isopropyl acrylate, n-butyl acrylate, sec-butyl acrylate, tert-butyl acrylate, pentyl acrylate, hexyl acrylate, heptyl acrylate, octyl acrylate, 3,3,5-trimethylhexyl acrylate, 2-ethylhexyl acrylate, nonyl acrylate, decyl acrylate, lauryl acrylate, n-tetradecyl acrylate, oxtadecyl acrylate, cyclohexyl acrylate, phenyl acrylate, methoxymethyl acrylate, methoxyethyl acrylate, ethoxymethyl acrylate, ethoxyethyl acrylate, perfluorooctyl acrylate, stearyl acrylate or a combination thereof. In some embodiments, the ester group-containing monomer is cyclohexyl acrylate, cyclohexyl methacrylate, isobornyl acrylate, isobornyl methacrylate, 3,3,5-trimethylcyclohexylacrylate, or a combination thereof. In some embodiments, the ester group-containing monomer is methyl methacrylate, ethyl methacrylate, n-propyl methacrylate, isopropyl methacrylate, n-butyl methacrylate, sec-butyl methacrylate, tert-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, 2,2,2-trifluoroethyl methacrylate, phenyl methacrylate, benzyl methacrylate, or a combination thereof.

In some embodiments, the binder composition is free of structural unit derived from a conjugated diene group-containing monomer. Examples of conjugated diene group-containing monomer include aliphatic conjugated diene monomers such as 1,3-butadiene, 2-methyl-1,3-butadiene, 2,3-dimethyl-1,3-butadiene, 2-chloro-1,3-butadiene, substituted linear conjugated pentadienes, and substituted side chain conjugated hexadienes.

In some embodiments, the binder composition is free of structural unit derived from an aromatic vinyl group-containing monomer. Examples of aromatic vinyl group-containing monomer include styrene, α-methylstyrene, vinyltoluene, and divinylbenzene.

In some embodiments, the pH of the binder composition is from about 7 to about 9, from about 7 to about 8.9, from about 7 to about 8.8, from about 7 to about 8.7, from about 7 to about 8.6, from about 7 to about 8.5, from about 7 to about 8.4, from about 7 to about 8.3, from about 7 to about 8.2, from about 7 to about 8.1, from about 7 to about 8, from about 7.1 to about 9, from about 7.2 to about 9, from about 7.3 to about 9, from about 7.4 to about 9, from about 7.5 to about 9, from about 7.6 to about 9, from about 7.7 to about 9, from about 7.8 to about 9, from about 7.9 to about 9 or from about 8 to about 9.

In certain embodiments, the pH of the binder composition is less than 9, less than 8.9, less than 8.8, less than 8.7, less than 8.6, less than 8.5, less than 8.4, less than 8.3, less than 8.2, less than 8.1, less than 8, less than 7.9, less than 7.8, less than 7.7, less than 7.6, less than 7.5, less than 7.4, less than 7.3 or less than 7.2. In certain embodiments, the pH of the binder composition is more than 7, more than 7.1, more than 7.2, more than 7.3, more than 7.4, more than 7.5, more than 7.6, more than 7.7, more than 7.8, more than 7.9, more than 8, more than 8.1, more than 8.2, more than 8.3, more than 8.4, more than 8.5, more than 8.6, more than 8.7 or more than 8.8.

In some embodiments, the viscosity of the binder composition is from about 10,000 mPa·s to about 50,000 mPa·s, from about 10,000 mPa·s to about 47,500 mPa·s, from about 10,000 mPa·s to about 45,000 mPa·s, from about 10,000 mPa·s to about 42,500 mPa·s, from about 10,000 mPa·s to about 40,000 mPa·s, from about 10,000 mPa·s to about 37,500 mPa·s, from about 10,000 mPa·s to about 35,000 mPa·s, from about 10,000 mPa·s to about 32,500 mPa·s, from about 10,000 mPa·s to about 30,000 mPa·s, from about 10,000 mPa·s to about 29,000 mPa·s, from about 10,000 mPa·s to about 28,000 mPa·s, from about 10,000 mPa·s to about 27,000 mPa·s, from about 10,000 mPa·s to about 26,000 mPa·s, from about 10,000 mPa·s to about 25,000 mPa·s, from about 10,000 mPa·s to about 24,000 mPa·s, from about 10,000 mPa·s to about 23,000 mPa·s, from about 10,000 mPa·s to about 22,000 mPa·s, from about 10,000 mPa·s to about 21,000 mPa·s, from about 10,000 mPa·s to about 20,000 mPa·s, from about 15,000 mPa·s to about 30,000 mPa·s, from about 15,000 mPa·s to about 25,000 mPa·s, from about 15,000 mPa·s to about 35,000 mPa·s.

In some embodiments, the viscosity of the binder composition is less than 50,000 mPa·s, less than 47,500 mPa·s, less than 45,000 mPa·s, less than 42,500 mPa·s, less than 40,000 mPa·s, less than 37,500 mPa·s, less than 35,000 mPa·s, less than 32,500 mPa·s, less than 30,000 mPa·s, less than 27,500 mPa·s, less than 25,000 mPa·s, less than 22,500 mPa·s, less than 20,000 mPa·s, less than 17,500 mPa·s, less than 15,000 mPa·s or less than 12,500 mPa·s. In some embodiments, the viscosity of the binder composition is more than 10,000 mPa·s, more than 12,500 mPa·s, more than 15,000 mPa·s, more than 17,500 mPa·s, more than 20,000 mPa·s, more than 22,500 mPa·s, more than 25,000 mPa·s, more than 27,500 mPa·s, more than 30,000 mPa·s, more than 32,500 mPa·s, more than 35,000 mPa·s, more than 37,500 mPa·s, more than 40,000 mPa·s, more than 42,500 mPa·s, more than 45,000 mPa·s, more than 47,500 mPa·s.

In some embodiments, the solid content of the binder composition is from about 5% to about 10%, from about 5% to about 9.9%, from about 5% to about 9.8%, from about 5% to about 9.7%, from about 5% to about 9.6%, from about 5% to about 9.5%, from about 5% to about 9.4%, from about 5% to about 9.3%, from about 5% to about 9.2%, from about 5% to about 9.1%, from about 5% to about 9%, from about 5.1% to about 9%, from about 5.2% to about 9%, from about 5.3% to about 9%, from about 5.4% to about 9%, from about 5.5% to about 9%, from about 5.6% to about 9%, from about 5.7% to about 9%, from about 5.8% to about 9%, from about 5.9% to about 9%, from about 6% to about 9%, from about 6% to about 8.9%, from about 6% to about 8.8%, from about 6% to about 8.7%, from about 6% to about 8.6%, from about 6% to about 8.5%, from about 6% to about 8.4%, from about 6% to about 8.3%, from about 6% to about 8.2%, from about 6% to about 8.1%, from about 6% to about 8%, from about 6% to about 9.8%, from about 6% to about 9.6%, from about 6% to about 9.4% or from about 6% to about 9.2%, by weight, based on the total weight of the binder composition.

In some embodiments, the solid content of the binder composition is less than 10%, less than 9.8%, less than 9.6%, less than 9.4%, less than 9.2%, less than 9%, less than 8.8%, less than 8.6%, less than 8.4%, less than 8.2%, less than 8%, less than 7.8%, less than 7.6%, less than 7.4%, less than 7.2%, less than 7%, less than 6.8%, less than 6.6%, less than 6.4%, less than 6.2%, less than 6%, less than 5.8%, less than 5.6%, less than 5.4% or less than 5.2% by weight, based on the total weight of the binder composition. In some embodiments, the solid content of the binder composition is more than 5%, more than 5.2%, more than 5.4%, more than 5.6%, more than 5.8%, more than 6%, more than 6.2%, more than 6.4%, more than 6.6%, more than 6.8%, more than 7%, more than 7.2%, more than 7.4%, more than 7.6%, more than 7.8%, more than 8%, more than 8.2%, more than 8.4%, more than 8.6%, more than 8.8%, more than 9%, more than 9.2%, more than 9.4%, more than 9.6% or more than 9.8% by weight, based on the total weight of the binder composition.

In some embodiments, the weight average molecular weight of the binder composition is from about 50,000 g/mol to about 200,000 g/mol, from about 55,000 g/mol to about 200,000 g/mol, from about 60,000 g/mol to about 200,000 g/mol, from about 65,000 g/mol to about 200,000 g/mol, from about 70,000 g/mol to about 200,000 g/mol, from about 75,000 g/mol to about 200,000 g/mol, from about 80,000 g/mol to about 200,000 g/mol, from about 85,000 g/mol to about 200,000 g/mol, from about 90,000 g/mol to about 200,000 g/mol, from about 90,000 g/mol to about 190,000 g/mol, from about 90,000 g/mol to about 180,000 g/mol, from about 90,000 g/mol to about 170,000 g/mol, from about 90,000 g/mol to about 160,000 g/mol, from about 95,000 g/mol to about 160,000 g/mol, from about 100,000 g/mol to about 160,000 g/mol, from about 100,000 g/mol to about 155,000 g/mol, from about 100,000 g/mol to about 150,000 g/mol, from about 100,000 g/mol to about 145,000 g/mol or from about 100,000 g/mol to about 140,000 g/mol. When the weight average molecular weight of the binder composition is not more than the upper limit set forth above, a smooth binder composition layer can be obtained because coatability of the binder composition is ensured, and adhesive strength of the binder composition can be improved. On the other hand, when the weight average molecular weight of the binder composition is not less than the lower limit set forth above, binding capability of the binder composition can be ensured, and adhesive strength of the binder composition and secondary battery cycle characteristics can be improved.

In some embodiments, the weight average molecular weight of the binder composition is less than 200,000 g/mol, less than 195,000 g/mol, less than 190,000 g/mol, less than 185,000 g/mol, less than 180,000 g/mol, less than 175,000 g/mol, less than 170,000 g/mol, less than 165,000 g/mol, less than 160,000 g/mol, less than 155,000 g/mol, less than 150,000 g/mol, less than 145,000 g/mol, less than 140,000 g/mol, less than 135,000 g/mol, less than 130,000 g/mol, less than 125,000 g/mol, less than 120,000 g/mol, less than 115,000 g/mol, less than 110,000 g/mol, less than 105,000 g/mol, less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol or less than 60,000 g/mol. In some embodiments, the weight average molecular weight of the binder composition is more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol, more than 95,000 g/mol, more than 100,000 g/mol, more than 105,000 g/mol, more than 110,000 g/mol, more than 115,000 g/mol, more than 120,000 g/mol, more than 125,000 g/mol, more than 130,000 g/mol, more than 135,000 g/mol, more than 140,000 g/mol, more than 145,000 g/mol, more than 150,000 g/mol, more than 155,000 g/mol, more than 160,000 g/mol, more than 165,000 g/mol, more than 170,000 g/mol, more than 175,000 g/mol, more than 180,000 g/mol, more than 185,000 g/mol, more than 190,000 g/mol or more than 195,000 g/mol.

In some embodiments, the number average molecular weight of the binder composition is from about 10,000 g/mol to about 100,000 g/mol, from about 15,000 g/mol to about 100,000 g/mol, from about 20,000 g/mol to about 100,000 g/mol, from about 25,000 g/mol to about 100,000 g/mol, from about 30,000 g/mol to about 100,000 g/mol, from about 35,000 g/mol to about 100,000 g/mol, from about 40,000 g/mol to about 100,000 g/mol, from about 45,000 g/mol to about 100,000 g/mol, from about 50,000 g/mol to about 100,000 g/mol, from about 50,000 g/mol to about 95,000 g/mol, from about 50,000 g/mol to about 90,000 g/mol, from about 50,000 g/mol to about 85,000 g/mol, from about 50,000 g/mol to about 80,000 g/mol, from about 55,000 g/mol to about 80,000 g/mol, from about 60,000 g/mol to about 80,000 g/mol, from about 65,000 g/mol to about 75,000 g/mol or from about 60,000 g/mol to about 90,000 g/mol.

In some embodiments, the number average molecular weight of the binder composition is less than 100,000 g/mol, less than 95,000 g/mol, less than 90,000 g/mol, less than 85,000 g/mol, less than 80,000 g/mol, less than 75,000 g/mol, less than 70,000 g/mol, less than 65,000 g/mol, less than 60,000 g/mol, less than 55,000 g/mol, less than 50,000 g/mol, less than 45,000 g/mol, less than 40,000 g/mol, less than 35,000 g/mol, less than 30,000 g/mol, less than 25,000 g/mol, less than 20,000 g/mol or less than 15,000 g/mol. In some embodiments, the number average molecular weight of the binder composition is more than 10,000 g/mol, more than 15,000 g/mol, more than 20,000 g/mol, more than 25,000 g/mol, more than 30,000 g/mol, more than 35,000 g/mol, more than 40,000 g/mol, more than 45,000 g/mol, more than 50,000 g/mol, more than 55,000 g/mol, more than 60,000 g/mol, more than 65,000 g/mol, more than 70,000 g/mol, more than 75,000 g/mol, more than 80,000 g/mol, more than 85,000 g/mol, more than 90,000 g/mol or more than 95,000 g/mol.

In some embodiments, the polydispersity index (PDI) of the binder composition is from about 1 to about 5, from about 1 to about 4.8, from about 1 to about 4.6, from about 1 to about 4.4, from about 1 to about 4.2, from about 1 to about 4, from about 1 to about 3.8, from about 1 to about 3.6, from about 1 to about 3.4, from about 1 to about 3.2, from about 1 to about 3, from about 1.1 to about 3, from about 1.2 to about 3, from about 1.3 to about 3, from about 1.4 to about 3, from about 1.5 to about 3, from about 1.6 to about 3, from about 1.6 to about 2.8, from about 1.6 to about 2.6, from about 1.8 to about 2.6 or from about 1.8 to about 2.8. Stability of the binder composition can be further improved when the polydispersity index of the binder composition is within the range set forth above.

In some embodiments, the polydispersity index of the binder composition is less than 5, less than 4.8, less than 4.6, less than 4.4, less than 4.2, less than 4, less than 3.8, less than 3.6, less than 3.4, less than 3.2, less than 3, less than 2.8, less than 2.6, less than 2.4, less than 2.2, less than 2, less than 1.8, less than 1.6, less than 1.4 or less than 1.2. In some embodiments, the polydispersity index of the binder composition is more than 1, more than 1.2, more than 1.4, more than 1.6, more than 1.8, more than 2, more than 2.2, more than 2.4, more than 2.6, more than 2.8, more than 3, more than 3.2, more than 3.4, more than 3.6, more than 3.8, more than 4, more than 4.2, more than 4.4, more than 4.6 or more than 4.8.

The binder composition of the present invention exhibits strong adhesion to the current collector. It is important for the binder composition to have good adhesive strength to the current collector as it promotes the binding force of the electrode layer to the current collector in the making of battery electrode, prevents separation and enhances the mechanical stability of the electrode. In some embodiments, the adhesive strength between the binder composition and the current collector is from about 2 N/cm to about 4 N/cm, from about 2.1 N/cm to about 4 N/cm, from about 2.2 N/cm to about 4 N/cm, from about 2.3 N/cm to about 4 N/cm, from about 2.4 N/cm to about 4 N/cm, from about 2.5 N/cm to about 4 N/cm, from about 2.6 N/cm to about 4 N/cm, from about 2.7 N/cm to about 4 N/cm, from about 2.8 N/cm to about 4 N/cm, from about 2.9 N/cm to about 4 N/cm, from about 3 N/cm to about 4 N/cm, from about 2 N/cm to about 3.9 N/cm, from about 2 N/cm to about 3.8 N/cm, from about 2 N/cm to about 3.7 N/cm, from about 2 N/cm to about 3.6 N/cm, from about 2 N/cm to about 3.5 N/cm, from about 2 N/cm to about 3.4 N/cm, from about 2 N/cm to about 3.3 N/cm, from about 2 N/cm to about 3.2 N/cm, from about 2 N/cm to about 3.1 N/cm, from about 2 N/cm to about 3 N/cm, from about 2.5 N/cm to about 3.5 N/cm, from about 2.3 N/cm to about 3.7 N/cm, from about 2.5 N/cm to about 3 N/cm or from about 3 N/cm to about 3.5 N/cm.

In some embodiments, the adhesive strength between the binder composition and the current collector is less than 4 N/cm, less than 3.9 N/cm, less than 3.8 N/cm, less than 3.7 N/cm, less than 3.6 N/cm, less than 3.5 N/cm, less than 3.4 N/cm, less than 3.3 N/cm, less than 3.2 N/cm, less than 3.1 N/cm, less than 3 N/cm, less than 2.9 N/cm, less than 2.8 N/cm, less than 2.7 N/cm, less than 2.6 N/cm, less than 2.5 N/cm, less than 2.4 N/cm, less than 2.3 N/cm or less than 2.2 N/cm. In some embodiments, the adhesive strength between the binder composition and the current collector is more than 2 N/cm, more than 2.1 N/cm, more than 2.2 N/cm, more than 2.3 N/cm, more than 2.4 N/cm, more than 2.5 N/cm, more than 2.6 N/cm, more than 2.7 N/cm, more than 2.8 N/cm, more than 2.9 N/cm, more than 3 N/cm, more than 3.1 N/cm, more than 3.2 N/cm, more than 3.3 N/cm, more than 3.4 N/cm, more than 3.5 N/cm, more than 3.6 N/cm, more than 3.7 N/cm or more than 3.8 N/cm.

In another aspect, provided herein is an electrode for a secondary battery, comprising an electrode active material, a current collector and the binder composition prepared by the method described above. In other embodiments, the electrode further comprises a conductive agent.

In some embodiments, the electrode active material is a cathode active material, wherein the cathode active material is selected from the group consisting of $LiCoO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $Li_2MnO_3$, $LiFeO_2$, $LiFePO_4$, and combinations thereof, wherein each x is independently from 0.2 to 0.9; each y is independently from 0.1 to 0.45; and each z is independently from 0 to 0.2. In certain embodiments, the cathode active material is selected from the group consisting of $LiCoO_2$, $LiNiO_2$, $LiNi_xMn_yO_2$, $Li_{1+z}Ni_xMn_yCo_{1-x-y}O_2$ (NMC), $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode active material is not $LiCoO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode active material is not $LiNi_xMn_yO_2$, $Li_{1+z}Ni_xMn_yCo_{1-x-y}O_2$, or $LiNi_xCo_yAl_zO_2$, wherein each x is independently from 0.2 to 0.9; each y is independently from 0.1 to 0.45; and each z is independently from 0 to 0.2. In certain embodiments, the cathode active material is $Li_{1+x}Ni_aMn_bCo_cAl_{(1-a-b-c)}O_2$; wherein $-0.2 \leq x \leq 0.2$, $0 \leq a < 1$, $0 \leq b < 1$, $0 \leq c < 1$, and $a+b+c \leq 1$. In some embodiments, the cathode active material has the general formula $Li_{1+x}Ni_aMn_bCo_cAl_{(1-a-b-c)}O_2$, with $0.33 \leq a \leq 0.92$, $0.33 \leq a \leq 0.9$, $0.33 \leq a \leq 0.8$, $0.5 \leq a \leq 0.92$, $0.5 \leq a \leq 0.9$, $0.5 \leq a \leq 0.8$, $0.6 \leq a \leq 0.92$, or $0.6 \leq a \leq 0.9$; $0 \leq b \leq 0.5$, $0 \leq b \leq 0.3$, $0.1 \leq b \leq 0.5$, $0.1 \leq b \leq 0.4$, $0.1 \leq b \leq 0.3$, $0.1 \leq b \leq 0.2$, or $0.2 \leq b \leq 0.5$; $0 \leq c \leq 0.5$, $0 \leq c \leq 0.3$, $0.1 \leq c \leq 0.5$, $0.1 \leq c \leq 0.4$, $0.1 \leq c \leq 0.3$, $0.1 \leq c \leq 0.2$, or $0.2 \leq c \leq 0.5$.

In certain embodiments, the cathode active material is doped with a dopant selected from the group consisting of Fe, Ni, Mn, Al, Mg, Zn, Ti, La, Ce, Sn, Zr, Ru, Si, Ge, and combinations thereof. In some embodiments, the dopant is not Fe, Ni, Mn, Mg, Zn, Ti, La, Ce, Ru, Si, or Ge. In certain embodiments, the dopant is not Al, Sn, or Zr.

In some embodiments, the cathode active material is $LiNi_{0.33}Mn_{0.33}Co_{0.33}O_2$ (NMC333), $LiNi_{0.4}Mn_{0.4}Co_{0.2}O_2$, $LiNi_{0.5}Mn_{0.3}Co_{0.2}O_2$ (NMC532), $LiNi_{0.6}Mn_{0.2}Co_{0.2}O_2$ (NMC622), $LiNi_{0.7}Mn_{0.15}Co_{0.15}O_2$, $LiNi_{0.8}Mn_{0.1}Co_{0.1}O_2$ (NMC811), $LiNi_{0.92}Mn_{0.4}Co_{0.04}O_2$, $LiNi_{0.8}Co_{0.15}Al_{0.05}O_2$ (NCA), $LiNiO_2$ (LNO), and combinations thereof.

In other embodiments, the cathode active material is not $LiCoO_2$, $LiNiO_2$, $LiMnO_2$, $LiMn_2O_4$, or $Li_2MnO_3$. In further embodiments, the cathode active material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMnO_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$. In other embodiments, the core and the shell each independently comprise two or more lithium transition metal oxides. In some embodiments, one of the core or shell comprises only one lithium transition metal oxide, while the other comprises two or more lithium transition metal oxides. The lithium transition metal oxide or oxides in the core and the shell may be the same, or they may be different or partially different. In some embodiments, the two or more lithium transition metal oxides are uniformly distributed over the core. In certain embodiments, the two or more lithium transition metal oxides are not uniformly distributed over the core. In some embodiments, the cathode active material is not a core-shell composite.

In some embodiments, each of the lithium transition metal oxides in the core and the shell is independently doped with a dopant selected from the group consisting of Fe, Ni, Mn, Al, Mg, Zn, Ti, La, Ce, Sn, Zr, Ru, Si, Ge, and combinations thereof. In certain embodiments, the core and the shell each independently comprise two or more doped lithium transition metal oxides. In some embodiments, the two or more doped lithium transition metal oxides are uniformly distributed over the core and/or the shell. In certain embodiments, the two or more doped lithium transition metal oxides are not uniformly distributed over the core and/or the shell.

In some embodiments, the cathode active material comprises or is a core-shell composite comprising a core comprising a lithium transition metal oxide and a shell comprising a transition metal oxide. In certain embodiments, the lithium transition metal oxide is selected from the group consisting of $Li_{1+x}Ni_aMn_bCo_cAl_{(1-a-b-c)}O_2$, $LiCoO_2$, $LiNiO_2$, $LiMnO_2$, $Li_2Mn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$. In some embodiments, the transition metal oxide is selected from the group consisting of $Fe_2O_3$, $MnO_2$, $Al_2O_3$, $MgO$, $ZnO$, $TiO_2$, $La_2O_3$, $CeO_2$, $SnO_2$, $ZrO_2 RuO_2$ and combinations thereof. In certain embodiments, the shell comprises a lithium transition metal oxide and a transition metal oxide.

In some embodiments, the diameter of the core is from about 1 μm to about 15 μm, from about 3 μm to about 15 μm, from about 3 μm to about 10 μm, from about 5 μm to about 10 μm, from about 5 μm to about 45 μm, from about 5 μm to about 35 μm, from about 5 μm to about 25 μm, from about 10 μm to about 45 μm, from about 10 μm to about 40 μm, or from about 10 μm to about 35 μm, from about 10 μm to about 25 μm, from about 15 μm to about 45 μm, from about 15 μm to about 30 μm, from about 15 μm to about 25 μm, from about 20 μm to about 35 μm, or from about 20 μm to about 30 μm. In certain embodiments, the thickness of the shell is from about 1 μm to about 45 μm, from about 1 μm to about 35 μm, from about 1 μm to about 25 μm, from about 1 μm to about 15 μm, from about 1 μm to about 10 μm, from about 1 μm to about 5 μm, from about 3 μm to about 15 μm, from about 3 μm to about 10 μm, from about 5 μm to about 10 μm, from about 10 μm to about 35 μm, from about 10 μm to about 20 μm, from about 15 μm to about 30 μm, from about 15 μm to about 25 μm, or from about 20 μm to about 35 μm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

The current collector acts to collect electrons generated by electrochemical reactions of the cathode active material or to supply electrons required for the electrochemical reactions. In some embodiments, the current collector can be in the form of a foil, sheet or film. In certain embodiments, the current collector is stainless steel, titanium, nickel, aluminum, copper, or alloys thereof or electrically-conductive resin. In certain embodiments, the current collector has a two-layered structure comprising an outer layer and an inner layer, wherein the outer layer comprises a conductive material and the inner layer comprises an insulating material or another conductive material; for example, aluminum mounted with a conductive resin layer or a polymeric insulating material coated with an aluminum film. In some embodiments, the current collector has a three-layered structure comprising an outer layer, a middle layer and an inner layer, wherein the outer and inner layers comprise a conductive material and the middle layer comprises an insulating material or another conductive material; for example, a plastic substrate coated with a metal film on both sides. In certain embodiments, each of the outer layer, middle layer and inner layer is independently stainless steel, titanium, nickel, aluminum, copper, or alloys thereof or electrically-conductive resin. In some embodiments, the insulating material is a polymeric material selected from the group consisting of polycarbonate, polyacrylate, polyacrylonitrile, polyester, polyamide, polystyrene, polyurethane, polyepoxy, poly(acrylonitrile butadiene styrene), polyimide, polyolefin, polyethylene, polypropylene, polyphenylene sulfide, poly(vinyl ester), polyvinyl chloride, polyether, polyphenylene oxide, cellulose polymer and combinations thereof. In certain embodiments, the current collector has more than three layers. In some embodiments, the current collector is coated with a protective coating. In certain embodiments, the protective coating comprises a carbon-containing material. In some embodiments, the current collector is not coated with a protective coating.

The thickness of the current collector affects the volume it occupies within the battery, the amount of the electrode active material needed, and hence the capacity in the battery. In some embodiments, the current collector has a thickness from about 5 μm to about 30 μm. In certain embodiments, the current collector has a thickness from about 5 μm to about 20 μm, from about 5 μm to about 15 μm, from about 10 μm to about 30 μm, from about 10 μm to about 25 μm, or from about 10 μm to about 20 μm.

In some embodiments, the current collector has a thickness of less than 30 μm, less than 28 μm, less than 26 μm, less than 24 μm, less than 22 μm, less than 20 μm, less than 18 μm, less than 16 μm, less than 14 μm, less than 12 μm, less than 10 μm, less than 8 μm or less than 6 μm. In some embodiments, the current collector has a thickness of more than 5 μm, more than 7 μm, more than 10 μm, more than 12 μm, more than 14 μm, more than 16 μm, more than 18 μm, more than 20 μm, more than 22 μm, more than 24 μm, more than 26 μm or more than 28 μm.

The conductive agent is for enhancing the electrically-conducting property of an electrode. Any suitable material can act as the conductive agent. In some embodiments, the conductive agent is a carbonaceous material. Some non-limiting examples include carbon, carbon black, graphite, expanded graphite, graphene, graphene nanoplatelets, carbon fibers, carbon nano-fibers, graphitized carbon flake, carbon tubes, activated carbon, Super P, 0-dimensional KS6, 1-dimensional vapor grown carbon fibers (VGCF), mesoporous carbon and combinations thereof.

In addition, the cathode prepared using the binder composition in the present invention exhibits strong adhesion of the electrode layer to the current collector. It is important for the electrode layer to have good peeling strength to the current collector as this prevents delamination or separation of the electrode, which would greatly influence the mechanical stability of the electrodes and the cyclability of the battery. Therefore, the electrodes should have sufficient peeling strength to withstand the rigors of battery manufacture.

In some embodiments, the peeling strength between the current collector and the electrode layer is in the range from about 1.0 N/cm to about 8.0 N/cm, from about 1.0 N/cm to about 6.0 N/cm, from about 1.0 N/cm to about 5.0 N/cm, from about 1.0 N/cm to about 4.0 N/cm, from about 1.0 N/cm to about 3.0 N/cm, from about 1.0 N/cm to about 2.5 N/cm, from about 1.0 N/cm to about 2.0 N/cm, from about 1.2 N/cm to about 3.0 N/cm, from about 1.2 N/cm to about 2.5 N/cm, from about 1.2 N/cm to about 2.0 N/cm, from about 1.5 N/cm to about 3.0 N/cm, from about 1.5 N/cm to about 2.5 N/cm, from about 1.5 N/cm to about 2.0 N/cm, from about 1.8 N/cm to about 3.0 N/cm, from about 1.8 N/cm to about 2.5 N/cm, from about 2.0 N/cm to about 6.0 N/cm, from about 2.0 N/cm to about 5.0 N/cm, from about 2.0 N/cm to about 3.0 N/cm, from about 2.0 N/cm to about 2.5 N/cm, from about 2.2 N/cm to about 3.0 N/cm, from about 2.5 N/cm to about 3.0 N/cm, from about 3.0 N/cm to about 8.0 N/cm, from about 3.0 N/cm to about 6.0 N/cm, or from about 4.0 N/cm to about 6.0 N/cm.

In some embodiments, the peeling strength between the current collector and the electrode layer is 1.0 N/cm or more, 1.2 N/cm or more, 1.5 N/cm or more, 2.0 N/cm or more, 2.2 N/cm or more, 2.5 N/cm or more, 3.0 N/cm or more, 3.5 N/cm or more, 4.5 N/cm or more, 5.0 N/cm or more, 5.5 N/cm or more. In some embodiments, the peeling strength between the current collector and the electrode layer is less than 6.5 N/cm, less than 6.0 N/cm, less than 5.5 N/cm, less than 5.0 N/cm, less than 4.5 N/cm, less than 4.0 N/cm, less than 3.5 N/cm, less than 3.0 N/cm, less than 2.8 N/cm, less than 2.5 N/cm, less than 2.2 N/cm, less than 2.0 N/cm, less than 1.8 N/cm, or less than 1.5 N/cm.

The extent of swelling of the binder composition from an uptake of electrolyte in the secondary battery provides insight into the crystallinity of the binder composition, how the binder composition interacts with the electrolyte and the flexibility of the binder composition. On one hand, a binder composition of high crystallinity exhibits low swelling behavior that can act as barriers for solvent ingress, provides shorter ion transport pathways, thus reduces internal resistance and more importantly alter the mechanical properties of the swollen polymer, which are critical to stable battery performance. On the other hand, a binder composition of low crystallinity has a higher amount of amorphous regions where higher amounts of electrolyte can penetrate into the binder composition to ensure good ion transport without the binder composition breaking apart when subjected to expansion. A semi-crystalline binder composition disclosed herein benefits from both influence factors and therefore demonstrates exceptional electrochemical performance.

In some embodiments, the electrolyte swelling of the binder composition is from about 7% to about 10%, from about 7% to about 9.9%, from about 7% to about 9.8%, from about 7% to about 9.7%, from about 7% to about 9.6%, from about 7% to about 9.5%, from about 7% to about 9.4%, from about 7% to about 9.3%, from about 7% to about 9.2%, from about 7% to about 9.1%, from about 7% to about 9%, from about 7% to about 8.9%, from about 7% to about 8.8%, from about 7% to about 8.7%, from about 7% to about 8.6%, from about 7% to about 8.5%, from about 7% to about 8.4%, from about 7% to about 8.3%, from about 7% to about 8.2%, from about 7% to about 8.1%, from about 7% to about 8%, from about 7.1% to about 10%, from about 7.2% to about 10%, from about 7.3% to about 10%, from about 7.4% to about 10%, from about 7.5% to about 10%, from about 7.6% to about 10%, from about 7.7% to about 10%, from about 7.8% to about 10%, from about 7.9% to about 10%, from about 8% to about 10%, from about 7.5% to about 9.5%, from about 7.5% to about 9%, from about 8% to about 9% or from about 8% to about 9.5%.

In some embodiments, the electrolyte swelling of the binder composition is less than 10%, less than 9.9%, less than 9.8%, less than 9.7%, less than 9.6%, less than 9.5%, less than 9.4%, less than 9.3%, less than 9.2%, less than 9.1%, less than 9%, less than 8.9%, less than 8.8%, less than 8.7%, less than 8.6%, less than 8.5%, less than 8.4%, less than 8.3%, less than 8.2%, less than 8.1%, less than 8%, less than 7.9%, less than 7.8%, less than 7.7%, less than 7.6%, less than 7.5%, less than 7.4%, less than 7.3%, less than 7.2% or less than 7.1%. In some embodiments, the electrolyte swelling of the binder composition is more than 7%, more than 7.1%, more than 7.2%, more than 7.3%, more than 7.4%, more than 7.5%, more than 7.6%, more than 7.7%, more than 7.8%, more than 7.9%, more than 8%, more than 8.1%, more than 8.2%, more than 8.3%, more than 8.4%, more than 8.5%, more than 8.6%, more than 8.7%, more than 8.8%, more than 8.9%, more than 9%, more than 9.1%, more than 9.2%, more than 9.3%, more than 9.4%, more than 9.5%, more than 9.6%, more than 9.7%, more than 9.8% or more than 9.9%.

The method disclosed herein has the advantage that aqueous solvents can be used in the manufacturing process, which can save on processing time and equipment, as well as improve safety by eliminating the need to handle or recycle hazardous organic solvents. In addition, costs are reduced by simplifying the overall process. Therefore, this method is especially suited for industrial processes because of its low cost and ease of handling.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH values of the binder composition were measured by an electrode-type pH meter (ION 2700, Eutech Instruments).

The viscosities of the binder composition were measured using a rotational viscosity meter (NDJ-5S, Shanghai JT Electronic Technology Co. Ltd., China) at 25° C.

The adhesive strengths of the dried binder composition layers were measured by a tensile testing machine (DZ-106A, obtained from Dongguan Zonhow Test Equipment Co. Ltd., China). This test measures the average force required to peel a binder composition layer from the current collector at 180° angle in Newtons. The mean roughness depth ($R_z$) of the current collector is 2 μm. The binder composition was coated on the current collector and dried to obtain a binder composition layer of thickness 10 μm to 12 μm. The coated current collector was then placed in an environment of constant temperature of 25° C. and humidity of 50% to 60% for 30 minutes. A strip of adhesion tape (3M; US; model no. 810) with a width of 18 mm and a length of 20 mm was attached onto the surface of the binder composition layer. The binder composition strip was clipped onto the testing machine and the tape was folded back on itself at 180 degrees, and placed in a moveable jaw and pulled at room temperature and a peel rate of 300 mm per minute. The maximum stripping force measured was taken as the adhesive strength. Measurements were repeated three times to find the average value.

The electrolyte swelling of the binder composition measures the extent of mass change of binder composition before and after electrolyte soaking. Test samples of dried binder composition strips with a length of 50 mm to 60 mm and a width of 1 mm were prepared. The dried binder composition strips were further dried at 80° C. for 1 to 2 hours to completely remove the moisture in the strips. The weights of the dried binder composition strips were measured and the strips were placed in a sealed container with electrolyte after cooling. The binder composition strips were soaked in the electrolyte at 25° C. for 3 days. After removing the binder composition strips from the electrolyte-containing container, the electrolyte on the surface of the strips were absorbed with oil-absorbing papers. The weights of the soaked binder composition strips were measured. The electrolyte swelling is the ratio of the weight change of the strip before and after electrolyte soaking to the weight of the strip before electrolyte soaking. Measurements were repeated three times to find the average value.

The solid content of the binder composition measures the extent of mass change of binder composition before and after drying. Approximately 1 g of a binder composition was weighed in a weighing bottle and dried at 110±5° C. and −0.09 MPa for more than 5 hours by a vacuum dryer. The binder composition was cooled in a desiccator for about 15 minutes and then measured in terms of mass. The difference in mass of the binder composition before and after the drying was determined, and the solid content (%) of the binder composition was calculated according to the following formula:

$$\text{Solid content (\%)} = \frac{\text{Mass of binder composition after drying}}{\text{Mass of binder composition before drying}} \times 100\%$$

The weight average molecular weight and number average molecular weight of the binder composition were measured by gel permeation chromatography (GPC). The binder composition was firstly dissolved in dimethylformamide at room temperature. Once dissolution of the binder composition was completed, the solution was gently filtered through a 0.45 μm filter to prepare a measurement sample. A standard polystyrene was used to prepare a calibration curve such that the weight average molecular weight and the number average molecular weight were calculated as standard substance equivalent values. The distribution of molecular weights in the binder composition is described by the Polydispersity Index (PDI) that is the ratio of the weight average molecular weight to the number average molecular weight. The obtained measurement sample was analyzed under the following conditions:

Column Agilent PLgel Sum MIXED-C column
Eluent: Dimethylformamide
Flow rate: 1 ml/min
Weight of sample: 2 mg
Detector: Waters 2414 Refractive Index (RI) Detector
Detection temperature: 35° C.
Standard substance: Polystyrene Example 1

A) Preparation of Binder Composition 80 g of neutralizing agent (sodium hydroxide, NaOH) was added into a round-bottom flask containing 1500 g of distilled water. The mixture was stirred at 80 rpm for 30 mins to obtain a first suspension.

180 g of acrylic acid (AA) was dissolved in 200 g of DI water to form an AA solution. Thereafter, 380 g of AA solution was added into the first suspension. The mixture was further stirred at 80 rpm for 30 mins to obtain a second suspension.

94 g of acrylamide (AM) was dissolved in 200 g of DI water to form an AM solution. Thereafter, 294 g of AM solution was added into the second suspension. The mixture was further heated to 55° C. and stirred at 80 rpm for 45 mins to obtain a third suspension.

66 g of acrylonitrile (AN) was dissolved in 50 g of DI water to form an AN solution. Thereafter, 116 g of AN solution was added into the third suspension. The mixture was further stirred at 80 rpm at 55° C. for 10 mins to obtain a fourth suspension.

Further, 0.075 g of water-soluble free radical initiator (ammonium persulfate, APS; obtained from Aladdin Industries Corporation, China) was dissolved in 15 g of DI water and 0.0375 g of reducing agent (sodium bisulfite; obtained from Tianjin Damao Chemical Reagent Factory, China) was dissolved in 7.5 g of DI water. 15.075 g of APS solution and 7.5375 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 19.12 g of NaOH was dissolved in 3300 g of DI water. Thereafter, 3319.12 g of sodium hydroxide solution was added dropwise into the fifth suspension for 1 h to adjust pH to 7.59 to form the sixth suspension. The binder composition was furnished by filtration using 200 mesh filter paper. The solid content of the binder composition was 6.77 wt. %. The weight average molecular weight, the number average molecular weight and the polydispersity index of the binder composition were 125,031 g/mol, 55,437 g/mol and 2.26 respectively. The components of the binder composition of Example 1 and their respective proportions are shown in Table 1 below. The pH, solid content, viscosity, adhesive strength and electrolyte swelling of the binder composition of Example 1 were measured and are shown in Table 2 below.

B) Preparation of Positive Electrode

A first mixture was prepared by dispersing 0.9 g of conductive agent (SuperP; obtained from Timcal Ltd, Bodio, Switzerland) and 6 g of binder composition (6.77 wt. % solid content) in 7.4 g of deionized water while stirring with an overhead stirrer (R20, IKA). After the addition, the first mixture was further stirred for about 30 minutes at 25° C. at a speed of 1,200 rpm.

Thereafter, a second mixture was prepared by adding 28.2 g of NMC622 (obtained from Shandong Tianjiao New Energy Co., Ltd, China) in the first mixture at 25° C. while stirring with an overhead stirrer. Then, the second mixture was degassed under a pressure of about 10 kPa for 1 hour. Then, the second mixture was further stirred for about 60 minutes at 25° C. at a speed of 1,200 rpm to form a homogenized slurry.

The homogenized slurry was coated onto one side of an aluminum foil having a thickness of 14 μm as a current collector using a doctor blade coater. The coated slurry film on the aluminum foil was dried at about 85° C. for 120 minutes by a hot air dryer (DHG 10H, Huyue Equipment Co., Ltd., China) to form a cathode electrode layer. The electrode was then pressed to decrease the thickness of the cathode electrode layer to 27 μm and the surface density was 5.2 mg/cm$^2$.

C) Preparation of Negative Electrode

A negative electrode slurry was prepared by mixing 90 wt. % of hard carbon (BTR New Energy Materials Inc., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent in deionized water. The solid content of the anode slurry was 50 wt. %. The slurry was coated onto one side of a copper foil having a thickness of 8 μm using a doctor blade coater. The coated film on the copper foil was dried at about 85° C. for 120 minutes by a hot air dryer to obtain a negative electrode. The electrode was then pressed to decrease the thickness of the coating to 18 μm.

D) Assembling of Coin Cell

CR2032 coin-type Li cells were assembled in an argon-filled glove box. The coated cathode and anode sheets were cut into disc-form positive and negative electrodes, which were then assembled into an electrode assembly by stacking the cathode and anode electrode plates alternatively and then packaged in a case made of stainless steel of the CR2032 type. The cathode and anode electrode plates were kept apart by separators. The separator was a ceramic coated microporous membrane made of nonwoven fabric (MPM, Japan), which had a thickness of about 25 μm. The electrode assembly was then dried in a box-type resistance oven under vacuum (DZF-6020, obtained from Shenzhen Kejing Star Technology Co. Ltd., China) at 105° C. for about 16 hours.

An electrolyte was then injected into the case holding the packed electrodes under a high-purity argon atmosphere with a moisture and oxygen content of less than 3 ppm respectively. The electrolyte was a solution of $LiPF_6$ (1 M) in a mixture of ethylene carbonate (EC), ethyl methyl carbonate (EMC) and dimethyl carbonate (DMC) at a volume ratio of 1:1:1. After electrolyte filling, the coin cell was vacuum sealed and then mechanically pressed using a punch tooling with a standard circular shape.

E) Electrochemical Measurements

The coin cells were analyzed in a constant current mode using a multi-channel battery tester (BTS-4008-5V10mA, obtained from Neware Electronics Co. Ltd, China). After 1 cycle at C/20 was completed, they were charged and discharged at a rate of C/2. The charging/discharging cycling tests of the cells were performed between 3.0 and 4.3 V at a current density of C/2 at 25° C. to obtain the discharge capacity. The electrochemical performance of the coin cell of Example 1 was measured and is shown in Table 2 below.

Preparation of Binder Composition of Example 2

16 g of NaOH was added into a round-bottom flask containing 380 g of distilled water. The mixture was stirred at 80 rpm for 30 mins to obtain a first suspension.

35.80 g of AA was added into the first suspension. The mixture was further stirred at 80 rpm for 30 mins to obtain a second suspension.

18.70 g of AM was dissolved in 10 g of DI water to form an AM solution. Thereafter, 28.70 g of AM solution was added into the second suspension. The mixture was further heated to 55° C. and stirred at 80 rpm for 45 mins to obtain a third suspension.

13.50 g of AN was added into the third suspension. The mixture was further stirred at 80 rpm for 10 mins to obtain a fourth suspension.

Further, 0.015 g of APS was dissolved in 3 g of DI water and 0.0075 g of sodium bisulfite was dissolved in 1.5 g of DI water. 3.015 g of APS solution and 1.5075 g of sodium bisulfite solution were added into the fourth suspension. The mixture was stirred at 200 rpm for 24 h at 55° C. to obtain a fifth suspension.

After the complete reaction, the temperature of the fifth suspension was lowered to 25° C. 3.72 g of NaOH was dissolved in 400 g of DI water. Thereafter, 403.72 g of sodium hydroxide solution was added dropwise into the fifth suspension for 1 h to adjust pH to 7.31 to form the sixth suspension. The binder composition was furnished by filtration using 200 mesh filter paper. The solid content of the binder composition was 9.00 wt. %.

Example 3: A binder composition was prepared in the same manner as in Example 2, except that 36.04 g of AA was added in the preparation of the second suspension, 17.0 g of AM was added in the preparation of the third suspension and 14.96 g of AN was added in the preparation of the fourth suspension.

Example 4: A binder composition was prepared in the same manner as in Example 2, except that 37.4 g of AA was added in the preparation of the second suspension, 17.0 g of AM was added in the preparation of the third suspension and 13.6 g of AN was added in the preparation of the fourth suspension.

Example 5: A binder composition was prepared in the same manner as in Example 2, except that 40.8 g of AA was added in the preparation of the second suspension, 17.0 g of AM was added in the preparation of the third suspension, 10.2 g of AN was added in the preparation of the fourth suspension and 5.33 g of NaOH was added in the preparation of the sixth suspension.

Example 6: A binder composition was prepared in the same manner as in Example 2, except that 44.2 g of AA was added in the preparation of the second suspension, 17.0 g of AM was added in the preparation of the third suspension, 6.8 g of AN was added in the preparation of the fourth suspension and 6.23 g of NaOH was added in the preparation of the sixth suspension.

Example 7: A binder composition was prepared in the same manner as in Example 2, except that 47.6 g of AA was added in the preparation of the second suspension, 10.2 g of AM was added in the preparation of the third suspension, 10.2 g of AN was added in the preparation of the fourth suspension and 8.18 g of NaOH was added in the preparation of the sixth suspension.

Example 8: A binder composition was prepared in the same manner as in Example 2, except that 28.56 g of AA was added in the preparation of the second suspension, 23.12 g of AM was added in the preparation of the third suspension and 16.32 g of AN was added in the preparation of the fourth suspension.

Example 9: A binder composition was prepared in the same manner as in Example 2, except that 34.0 g of AA was added in the preparation of the second suspension, 23.8 g of AM was added in the preparation of the third suspension and 10.2 g of AN was added in the preparation of the fourth suspension.

Example 10: A binder composition was prepared in the same manner as in Example 2, except that 9.50 g of NaOH was added into the fifth suspension to adjust pH to 8.23 in the preparation of the sixth suspension.

Example 11: A binder composition was prepared in the same manner as in Example 2, except that 10.93 g of NaOH was added into the fifth suspension to adjust pH to 8.51 in the preparation of the sixth suspension.

Preparation of Binder Composition of Examples 12-14

The binder compositions of Examples 12-14 were prepared in the same manner as in Example 2.

Example 15: A binder composition was prepared in the same manner as in Example 2, except that 0.0204 g of APS was dissolved in 3 g of DI water and 0.0102 g of sodium bisulfite was dissolved in 1.5 g of DI water so that 3.0204 g of APS solution and 1.5102 g of sodium bisulfite solution were added in the preparation of the fifth suspension. The weight average molecular weight, the number average molecular weight and the polydispersity index of the binder composition were 78,528 g/mol, 33,523 g/mol and 2.34 respectively.

Example 16: A binder composition was prepared in the same manner as in Example 2, except that 0.0068 g of APS was dissolved in 3 g of DI water and 0.0034 g of sodium bisulfite was dissolved in 1.5 g of DI water so that 3.0068 g of APS solution and 1.5034 g of sodium bisulfite solution were added in the preparation of the fifth suspension. The weight average molecular weight, the number average molecular weight and the polydispersity index of the binder composition were 175,432 g/mol, 82,640 g/mol and 2.12 respectively.

Comparative Example 1

A binder composition was prepared in the same manner as in Example 2, except that 30.6 g of AA was added in the preparation of the second suspension, 10.2 g of AM was added in the preparation of the third suspension and 27.2 g of AN was added in the preparation of the fourth suspension.

Comparative Example 2

A binder composition was prepared in the same manner as in Example 2, except that 44.2 g of AA was added in the preparation of the second suspension, 20.4 g of AM was added in the preparation of the third suspension, 3.4 g of AN was added in the preparation of the fourth suspension and 6.5 g of NaOH was added in the preparation of the sixth suspension.

Comparative Example 3

A binder composition was prepared in the same manner as in Example 2, except that 51.0 g of AA was added in the preparation of the second suspension, 10.2 g of AM was added in the preparation of the third suspension, 6.8 g of AN was added in the preparation of the fourth suspension and 10.42 g of NaOH was added in the preparation of the sixth suspension.

Comparative Example 4

A binder composition was prepared in the same manner as in Example 2, except that 46.92 g of AA was added in the preparation of the second suspension, 5.44 g of AM was added in the preparation of the third suspension, 15.64 g of AN was added in the preparation of the fourth suspension and 8.23 g of NaOH was added in the preparation of the sixth suspension.

Comparative Example 5

A binder composition was prepared in the same manner as in Example 2, except that 30.6 g of AA was added in the preparation of the second suspension, 30.6 g of AM was added in the preparation of the third suspension and 6.8 g of AN was added in the preparation of the fourth suspension.

Comparative Example 6

A binder composition was prepared in the same manner as in Example 2, except that 8 g of NaOH was added in the preparation of the first suspension, 20.4 g of AA was added in the preparation of the second suspension, 31.96 g of AM was added in the preparation of the third suspension, 15.64 g of AN was added in the preparation of the fourth suspension and 3.21 g of NaOH was added in the preparation of the sixth suspension.

Comparative Example 7

A binder composition was prepared in the same manner as in Example 2, except that 5 g of NaOH was added in the preparation of the first suspension, 13.6 g of AA was added in the preparation of the second suspension, 27.2 g of AM was added in the preparation of the third suspension, 27.2 g of AN was added in the preparation of the fourth suspension and 2.1 g of NaOH was added in the preparation of the sixth suspension.

Comparative Example 8

A binder composition was prepared in the same manner as in Example 2, except that 57.8 g of AA was added in the preparation of the second suspension, 6.8 g of AM was added in the preparation of the third suspension, 3.4 g of AN was added in the preparation of the fourth suspension and 13.5 g of NaOH was added in the preparation of the sixth suspension.

Comparative Example 9

A binder composition was prepared in the same manner as in Example 2, except that 34.0 g of AA and 6.8 g of methyl acrylate (MA) were added in the preparation of the second suspension, 13.6 g of AM was added in the preparation of the third suspension, 13.6 g of AN was added in the preparation of the fourth suspension and 3.72 g of NaOH was added in the preparation of the sixth suspension.

Comparative Example 10

A binder composition was prepared in the same manner as in Example 2, except that 34.0 g of AA was added in the preparation of the second suspension, 14.96 g of AM was added in the preparation of the third suspension and 19.04 g of AN was added in the preparation of the fourth suspension.

Preparation of Positive Electrode of Examples 2-11, 15-16 and Comparative Examples 1-10

The positive electrodes of Examples 2-11, 15-16 and Comparative Examples 1-10 were prepared in the same manner as in Example 1.

Preparation of Positive Electrode of Example 12

The positive electrode of Example 12 was prepared in the same manner as in Example 1, except that the 28.2 g of NMC622 was replaced with NMC532 (obtained from Tianjin Bamo Technology Co., Ltd., China) of the same weight.

Preparation of Positive Electrode of Example 13

The positive electrode of Example 13 was prepared in the same manner as in Example 1, except that the 28.2 g of NMC622 was replaced with $LiCoO_2$ (obtained from Tianjin Bamo Technology Co., Ltd., China) of the same weight.

Preparation of Positive Electrode of Example 14

The positive electrode of Example 14 was prepared in the same manner as in Example 1, except that the 28.2 g of NMC622 was replaced with $LiFePO_4$ (obtained from Xiamen Tungsten Industry Co., Ltd., China) of the same weight.

Preparation of Negative Electrode of Examples 2-16 and Comparative Examples 1-10

The negative electrodes of Examples 2-16 and Comparative Examples 1-10 were prepared in the same manner as in Example 1.

Assembling of Coin Cells of Examples 2-16 and Comparative Examples 1-10

The coin cells of Examples 2-16 and Comparative Examples 1-10 were assembled in the same manner as in Example 1.

Electrochemical Measurements of Examples 2-16 and Comparative Examples 1-10

The electrochemical performance of the coin cells of Examples 2-16 and Comparative Examples 1-10 were measured in the same manner as in Example 1 and the test results are shown in Table 2 below.

TABLE 1

Monomers added in the preparation of binder composition

| | AN* | AA* | AM* | MA* |
|---|---|---|---|---|
| | \multicolumn{4}{c}{Proportion of monomer (wt %)} | | | |
| Example 1 | 19.41 | 52.94 | 27.65 | 0.00 |
| Example 2 | 19.85 | 52.65 | 27.50 | 0.00 |
| Example 3 | 22.00 | 53.00 | 25.00 | 0.00 |
| Example 4 | 20.00 | 55.00 | 25.00 | 0.00 |
| Example 5 | 15.00 | 60.00 | 25.00 | 0.00 |
| Example 6 | 10.00 | 65.00 | 25.00 | 0.00 |
| Example 7 | 15.00 | 70.00 | 15.00 | 0.00 |
| Example 8 | 24.00 | 42.00 | 34.00 | 0.00 |
| Example 9 | 15.00 | 50.00 | 35.00 | 0.00 |
| Example 10 | 19.85 | 52.65 | 27.50 | 0.00 |
| Example 11 | 19.85 | 52.65 | 27.50 | 0.00 |
| Example 12 | 19.85 | 52.65 | 27.50 | 0.00 |
| Example 13 | 19.85 | 52.65 | 27.50 | 0.00 |
| Example 14 | 19.85 | 52.65 | 27.50 | 0.00 |
| Example 15 | 19.85 | 52.65 | 27.50 | 0.00 |
| Example 16 | 19.85 | 52.65 | 27.50 | 0.00 |
| Comparative Example 1 | 40.00 | 45.00 | 15.00 | 0.00 |
| Comparative Example 2 | 5.00 | 65.00 | 30.00 | 0.00 |
| Comparative Example 3 | 10.00 | 75.00 | 15.00 | 0.00 |
| Comparative Example 4 | 23.00 | 69.00 | 8.00 | 0.00 |
| Comparative Example 5 | 10.00 | 45.00 | 45.00 | 0.00 |
| Comparative Example 6 | 23.00 | 30.00 | 47.00 | 0.00 |
| Comparative Example 7 | 40.00 | 20.00 | 40.00 | 0.00 |
| Comparative Example 8 | 5.00 | 85.00 | 10.00 | 0.00 |
| Comparative Example 9 | 20.00 | 50.00 | 20.00 | 10.00 |
| Comparative Example 10 | 28.00 | 50.00 | 22.00 | 0.00 |

*AN refers to acrylonitrile, AA refers to acrylic acid, AM refers to acrylamide and MA refers to methyl acrylate.

TABLE 2

| | Physical properties of binder composition | | | | 0.5 C Initial discharging capacity (mAh/g) | Capacity retention after 50 cycles (%) | Capacity retention after 100 cycles (%) |
|---|---|---|---|---|---|---|---|
| | pH | Solid content (%) | Viscosity (mPa · s) | Electrolyte swelling (%) | Adhesive strength (N/cm) | | | |
| Example 1 | 7.59 | 6.77 | 40,700 | 7.61 | 2.62 | 156 | 87.95 | 76.92 |
| Example 2 | 7.31 | 9.00 | 40,920 | 7.62 | 3.27 | 168 | 87.10 | 74.04 |
| Example 3 | 7.86 | 8.07 | 39,029 | 9.58 | 2.73 | 173 | 88.82 | 75.90 |
| Example 4 | 7.05 | 7.50 | 25,920 | 7.39 | 3.37 | 158 | 86.27 | 73.91 |
| Example 5 | 7.71 | 5.73 | 17,910 | 8.41 | 3.19 | 167 | 88.10 | 74.64 |
| Example 6 | 7.33 | 7.09 | 34,960 | 8.51 | 3.25 | 158 | 83.90 | 71.54 |
| Example 7 | 7.57 | 6.34 | 11,220 | 8.99 | 2.11 | 169 | 82.87 | 70.12 |
| Example 8 | 7.94 | 6.10 | 45,980 | 7.03 | 3.67 | 142 | 87.73 | 74.92 |
| Example 9 | 7.47 | 8.34 | 35,370 | 9.15 | 3.72 | 148 | 86.27 | 74.53 |
| Example 10 | 8.23 | 8.81 | 41,080 | 7.72 | 3.74 | 167 | 87.50 | 74.39 |
| Example 11 | 8.51 | 9.14 | 39,220 | 7.72 | 3.52 | 155 | 87.24 | 74.12 |
| Example 12 | 7.54 | 8.61 | 41,830 | 7.54 | 3.85 | 158 | 88.60 | 75.04 |
| Example 13 | 7.44 | 8.94 | 38,750 | 7.23 | 3.49 | 168 | 82.30 | 70.48 |
| Example 14 | 7.46 | 8.54 | 40,200 | 7.29 | 3.14 | 147 | 92.50 | 84.20 |
| Example 15 | 7.39 | 9.20 | 38,580 | 7.72 | 3.22 | 166 | 88.98 | 77.85 |
| Example 16 | 7.23 | 9.14 | 41,070 | 7.45 | 3.29 | 154 | 88.28 | 76.89 |
| Comparative Example 1 | 7.90 | 6.43 | 21,390 | 8.67 | 1.24 | 132 | 78.61 | 57.83 |
| Comparative Example 2 | 7.87 | 6.25 | 38,460 | 8.22 | 1.40 | 129 | 78.78 | 58.42 |
| Comparative Example 3 | 7.23 | 5.58 | 55,450 | 9.88 | 1.11 | 131 | 80.58 | 61.21 |
| Comparative Example 4 | 7.34 | 5.82 | 37,380 | 11.45 | 1.52 | 127 | 79.17 | 55.84 |
| Comparative Example 5 | 7.79 | 9.48 | 30,880 | 4.91 | 1.46 | 134 | 78.23 | 55.49 |
| Comparative Example 6 | 7.03 | 7.66 | 21,080 | 3.57 | 1.45 | 129 | 80.96 | 58.82 |
| Comparative Example 7 | 7.78 | 7.53 | 18,130 | 5.01 | 1.39 | 132 | 78.99 | 57.32 |
| Comparative Example 8 | 7.07 | 7.38 | 64,880 | 11.41 | 0.70 | 125 | 81.11 | 63.92 |
| Comparative Example 9 | 7.74 | 7.11 | 32,500 | 8.09 | 2.19 | 127 | 78.81 | 55.26 |
| Comparative Example 10 | 7.26 | 6.93 | 41,010 | 8.30 | 2.41 | 122 | 79.03 | 55.97 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A binder composition for a secondary battery electrode comprising a copolymer, wherein the copolymer comprises a structural unit (a) derived from a carboxylic acid group-containing monomer, a structural unit (b) derived from an amide group-containing monomer and a structural unit (c) derived from a nitrile group-containing monomer, wherein a proportion of structural unit (a) derived from a carboxylic acid group-containing monomer in the copolymer is from about 33% to about 70% by mole, based on the total number of moles of monomeric units in the copolymer in the binder composition, wherein a proportion of structural unit (b) derived from an amide group-containing monomer in the copolymer is from about 10% to about 35% by mole, based on the total number of moles of monomeric units in the copolymer in the binder composition, and wherein a proportion of structural unit (c) derived from a nitrile group-containing monomer in the copolymer is from about 10% to about 30% by mole, based on the total number of moles of monomeric units in the copolymer in the binder composition.

2. The binder composition according to claim 1, wherein the secondary battery is a lithium-ion battery.

3. The binder composition according to claim 1, wherein the carboxylic acid group-containing monomer is selected from the group consisting of acrylic acid, methacrylic acid, crotonic acid, 2-butyl crotonic acid, cinnamic acid, maleic acid, maleic anhydride, fumaric acid, itaconic acid, itaconic anhydride, tetraconic acid, 2-ethylacrylic acid, isocrotonic acid, cis-2-pentenoic acid, trans-2-pentenoic acid, angelic acid, tiglic acid, 3,3-dimethyl acrylic acid, 3-propyl acrylic acid, trans-2-methyl-3-ethyl acrylic acid, cis-2-methyl-3-ethyl acrylic acid, 3-isopropyl acrylic acid, trans-3-methyl-3-ethyl acrylic acid, cis-3-methyl-3-ethyl acrylic acid, 2-isopropyl acrylic acid, trimethyl acrylic acid, 2-methyl-3,3-diethyl acrylic acid, 3-butyl acrylic acid, 2-butyl acrylic acid, 2-pentyl acrylic acid, 2-methyl-2-hexenoic acid, trans-3-methyl-2-hexenoic acid, 3-methyl-3-propyl acrylic acid, 2-ethyl-3-propyl acrylic acid, 2,3-diethyl acrylic acid, 3,3-diethyl acrylic acid, 3-methyl-3-hexyl acrylic acid, 3-methyl-3-tert-butyl acrylic acid, 2-methyl-3-pentyl acrylic acid, 3-methyl-3-pentyl acrylic acid, 4-methyl-2-hexenoic acid, 4-ethyl-2-hexenoic acid, 3-methyl-2-ethyl-2-hexenoic acid, 3-tert-butyl acrylic acid, 2,3-dimethyl-3-ethyl acrylic acid, 3,3-dimethyl-2-ethyl acrylic acid, 3-methyl-3-isopropyl acrylic acid, 2-methyl-3-isopropyl acrylic acid, trans-2-octenoic acid, cis-2-octenoic acid, trans-2-decenoic acid, α-acetoxyacrylic acid, β-trans-aryloxyacrylic acid, α-chloro-β-E-methoxyacrylic acid, methyl maleic acid, dimethyl maleic acid, phenyl maleic acid, bromo maleic acid, chloromaleic acid, dichloromaleic acid, fluoromaleic acid, difluoro maleic acid, nonyl hydrogen maleate, decyl hydrogen maleate, dodecyl hydrogen maleate, octadecyl hydrogen maleate, fluoroalkyl hydrogen maleate, maleic anhydride, methyl maleic anhydride, dimethyl maleic anhydride, acrylic anhydride, methacrylic anhydride, methacrolein, methacryloyl chloride, methacryloyl fluoride, methacryloyl bromide and combinations thereof.

4. The binder composition according to claim 1, wherein the carboxylic acid group-containing monomer comprises a combination of a carboxylic salt group and a carboxylic acid group; and wherein a molar ratio of the carboxylic acid group to the carboxylic salt group in the copolymer is from about 0 to about 0.2.

5. The binder composition according to claim 1, wherein the amide group-containing monomer is selected from the group consisting of methacrylamide, N-methyl methacrylamide, N-ethyl methacrylamide, N-n-propyl methacrylamide, N-isopropyl methacrylamide, N-n-butyl methacrylamide, N-isobutyl methacrylamide, N,N-dimethyl acrylamide, N,N-dimethyl methacrylamide, N,N-diethyl acrylamide, N,N-diethyl methacrylamide, N-methylol methacrylamide, N-(methoxymethyl) methacrylamide, N-(ethoxymethyl) methacrylamide, N-(propoxymethyl) methacrylamide, N-(butoxymethyl) methacrylamide, N,N-dimethylaminopropyl methacrylamide, N,N-dimethylaminoethyl methacrylamide, N,N-dimethylol methacrylamide, diacetone methacrylamide, methacryloyl morpholine and combinations thereof.

6. The binder composition according to claim 1, wherein the nitrile group-containing monomer is selected from the group consisting of acrylonitrile, α-halogenoacrylonitrile, α-alkylacrylonitrile, α-chloroacrylonitrile, α-bromoacrylonitrile, α-fluoroacrylonitrile, methacrylonitrile, α-ethylacrylonitrile, α-isopropylacrylonitrile, α-n-hexylacrylonitrile, α-methoxyacrylonitrile, 3-methoxyacrylonitrile, 3-ethoxyacrylonitrile, α-acetoxyacrylonitrile, α-phenylacrylonitrile, α-tolylacrylonitrile, α-(methoxyphenyl) acrylonitrile, α-(chlorophenyl) acrylonitrile, α-(cyanophenyl) acrylonitrile, vinylidene cyanide and combinations thereof.

7. The binder composition according to claim 1, wherein a proportion of the sum of structural unit (a) derived from a carboxylic acid group-containing monomer and structural unit (c) derived from a nitrile group-containing monomer in the copolymer is from about 65% to about 90% by mole, based on the total number of moles of monomeric units in the copolymer in the binder composition.

8. The binder composition according to claim 1, wherein a molar ratio of the sum of structural unit (a) derived from a carboxylic acid group-containing monomer and structural unit (c) derived from a nitrile group-containing monomer to the structural unit (b) derived from an amide group-containing monomer in the copolymer is from about 1 to about 7.

9. The binder composition according to claim 1, wherein a molar ratio of the sum of the structural unit (a) derived from a carboxylic acid group-containing monomer and structural unit (b) derived from an amide group-containing monomer to the structural unit (c) derived from a nitrile group-containing monomer in the copolymer is from about 1 to about 7.

10. The binder composition according to claim 1, wherein the binder composition is free of structural unit derived from an ester group-containing monomer; wherein the binder composition is free of structural unit derived from a conjugated diene group-containing monomer; and wherein the binder composition is free of structural unit derived from an aromatic vinyl group-containing monomer.

11. The binder composition according to claim 1, wherein an electrolyte swelling of the binder composition is from about 7% to about 10%.

12. The binder composition according to claim 1, wherein an adhesive strength between the binder composition and a current collector is from about 2 N/cm to about 4 N/cm.

13. The binder composition according to claim 1, wherein the binder composition further comprises a dispersion medium selected from the group consisting of water, ethanol, isopropanol, n-propanol, tert-butanol, n-butanol, dimethylacetamide (DMAc), dimethylformamide (DMF), N-methylpyrrolidone (NMP), methyl ethyl ketone (MEK), ethyl acetate (EA), butyl acetate (BA) and combinations thereof.

14. The binder composition according to claim 13, wherein a solid content of the binder composition is from about 5% to about 10% by weight, based on the total weight of the binder composition.

15. The binder composition according to claim 13, wherein a pH of the binder composition is from about 7 to about 9.

16. The binder composition according to claim 13, wherein a viscosity of the binder composition is from about 10,000 mPa·s to about 50,000 mPa·s.

17. An electrode for a secondary battery, comprising an electrode active material, a conductive agent and the binder composition according to claim 1.

18. The electrode according to claim 17, wherein a peeling strength between a current collector and an electrode layer is in the range from about 1.0 N/cm to about 8.0 N/cm.

19. The electrode according to claim 17, wherein the electrode active material is $LiCoO_2$, $LiNiO_2$, $LiNi_xMn_yO_2$, $Li_{1+z}Ni_xMn_yCo_{1-x-y}O_2$, $LiNi_xCo_yAl_2O_2$, $LiV_2O_5$, $LiTiS_2$, $LiMOS_2$, $LiMnO_2$, $LiCrO_2$, $LiMn_2O_4$, $Li_2MnO_3$, $LiFeO_2$, $LiFePO_4$, and combinations thereof, wherein each x is independently from 0.2 to 0.9; each y is independently from 0.1 to 0.45; and each z is independently from 0 to 0.2.

* * * * *